US008087007B2

(12) United States Patent  (10) Patent No.: US 8,087,007 B2
Duneau  (45) Date of Patent: Dec. 27, 2011

(54) SYSTEM AND METHOD FOR SOFTWARE PROTOTYPE-DEVELOPMENT AND VALIDATION AND FOR AUTOMATIC SOFTWARE SIMULATION RE-GRABBING

(75) Inventor: Eric Duneau, Surbiton (GB)

(73) Assignee: Assima Ltd., London (GB)

(*) Notice: Subject to any disclaimer, the term of this patent is extended or adjusted under 35 U.S.C. 154(b) by 1571 days.

(21) Appl. No.: 11/430,482

(22) Filed: May 8, 2006

(65) Prior Publication Data

US 2007/0261035 A1    Nov. 8, 2007

(51) Int. Cl.
G06F 9/44    (2006.01)
(52) U.S. Cl. ........ 717/135; 717/100; 717/109; 717/113; 717/125; 717/134
(58) Field of Classification Search .................. None
See application file for complete search history.

(56) References Cited

U.S. PATENT DOCUMENTS

| | | | |
|---|---|---|---|
| 5,247,651 A * | 9/1993 | Clarisse ........................... 703/13 |
| 5,701,443 A * | 12/1997 | Oguma et al. ..................... 703/15 |
| 5,963,724 A * | 10/1999 | Mantooth et al. ................ 703/14 |
| 5,980,096 A * | 11/1999 | Thalhammer-Reyero ............ 1/1 |
| 6,145,121 A * | 11/2000 | Levy et al. ..................... 717/135 |
| 6,477,549 B1 * | 11/2002 | Hishida et al. .................. 715/201 |
| 6,901,581 B1 * | 5/2005 | Schneider ...................... 717/124 |
| 7,035,784 B1 * | 4/2006 | Gillis ............................ 703/17 |
| 7,146,615 B1 * | 12/2006 | Hervet et al. .................. 719/318 |
| 7,231,337 B1 * | 6/2007 | Karchmer et al. ............... 703/15 |
| 7,349,837 B2 * | 3/2008 | Martin et al. ................... 703/22 |
| 7,356,679 B1 * | 4/2008 | Le et al. ........................... 713/1 |
| 7,478,026 B1 * | 1/2009 | Kushner et al. ................. 703/13 |
| 7,761,282 B2 * | 7/2010 | Alvey et al. ..................... 703/22 |
| 7,817,293 B2 * | 10/2010 | Boyd et al. .................... 358/1.15 |
| 2001/0011214 A1 * | 8/2001 | Shigeki et al. ................. 703/22 |
| 2002/0026301 A1 * | 2/2002 | Takeda ........................... 703/17 |
| 2002/0059054 A1 * | 5/2002 | Bade et al. ..................... 703/20 |
| 2002/0152244 A1 * | 10/2002 | Dean et al. .................... 707/530 |
| 2003/0164854 A1 * | 9/2003 | Polk ............................. 345/762 |
| 2004/0015813 A1 * | 1/2004 | Yerushalmy .................. 717/100 |
| 2004/0107085 A1 * | 6/2004 | Moosburger et al. ........... 703/13 |
| 2004/0216044 A1 | 10/2004 | Martin et al. |
| 2004/0216045 A1 | 10/2004 | Martin et al. |
| 2004/0221256 A1 | 11/2004 | Martin et al. |
| 2004/0221260 A1 | 11/2004 | Martin et al. |
| 2005/0022166 A1 * | 1/2005 | Wolff et al. .................... 717/124 |
| 2006/0248510 A1 * | 11/2006 | Dournov et al. ............... 717/124 |
| 2007/0213959 A1 * | 9/2007 | Kropaczek et al. ............... 703/1 |
| 2008/0295079 A1 * | 11/2008 | Yiftachel et al. .............. 717/126 |
| 2010/0257506 A1 * | 10/2010 | Clark ............................ 717/105 |

* cited by examiner

*Primary Examiner* — Insun Kang
(74) *Attorney, Agent, or Firm* — Kenyon & Kenyon LLP

(57) ABSTRACT

During execution of a program, a processor may identify one or more object class instantiations that are associated by the program with a program state obtained during the execution of the program, may store in a file a description of the identified object class instantiations, where at least a portion of the execution of the program is simulatable based on the file, and may modify the first file in response to a user interaction with a graphical representation of one of the described object class instantiations, where a modified version of the portion of the execution of the program is simulatable based on the modified first file.

28 Claims, 14 Drawing Sheets

Full-text editing window
700

SYSTEM AND METHOD FOR SOFTWARE PROTOTYPE-DEVELOPMENT AND VALIDATION AND FOR AUTOMATIC SOFTWARE SIMULATION RE-GRABBING

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a system and method for facilitating development of a software prototype and validating modified software against the prototype. The present invention further relates to automatic re-capture (also referred to herein as "re-grabbing") of a simulation of the software, and in particular, for validating the modified software.

BACKGROUND INFORMATION

Development of computer software, especially complex software, requires collaboration of designers and programmers. Once a program version is developed, it is often required to modify it. In particular, it is often required to modify a generic software application to tailor it to the needs of a particular entity. Where software, such as Enterprise Resource Planning (ERP) software, is developed for large entities, each group may include a large number of people assigned different tasks. For example, the designers may include a business model design team and software design team. The software design team may create software specifications for modeling a software process satisfying the identified business needs. Further, different sub-groups may be assigned to different aspects of business model and software specification development, which are then to be consolidated to create the software specifications to be passed on to the programmers. The programmers, too, may be assigned to the coding of different software parts to be used in concert.

The specifications for software development are therefore often disorganized. Additionally, the specifications are often based on the software designers' mental conceptualizations of the software modifications. Actual modifications may therefore be different than expected by the software designers, requiring another iteration of specifications development and software modification.

Additionally, the software coding for implementation of the specification often falls short of the specifications provided to the programmers. Testing is therefore required for ensuring that the programmed software application matches the specifications. This includes a potentially lengthy task of manual testing by domain experts to ensure that the programmed software complies with the expected application behavior as defined by the specifications.

The procedure is prone to error, with respect to the software designers' understanding of the business model designers' requirements, the software designers' conceptualization of the application behavior according to their specifications, the programmers' understanding of the expected application behavior as set forth in the specifications, and the testing of the coded software.

The software development procedure may therefore require numerous iterations and cost an enormous amount, with respect to both time and money.

Furthermore, for implementation of software, users are trained in their use. Such training often requires simulations of an actual use of the software. However, a simulation may become outdated in view of software modifications implemented subsequent to creation of the simulation. It is therefore required to modify the simulation, which requires determination of how the modifications affect the simulation, or to create an entirely new software simulation.

Accordingly, there is a need in the art for a system and method for increasing efficiency of software development and modification with respect to developer and tester time, and for streamlining the interaction of the various contributors of the software development, and there is a need in the art for a system and method for streamlining software modification with training simulation updates.

DETAILED DESCRIPTION OF EXAMPLE EMBODIMENTS

Embodiments of the present invention provide for a system and method that may increase efficiency of software development. The system and method may provide a modifiable application simulation that may mimic a procedure executed during operation of the application. The system and method may provide for playing the simulation after simulation modification. The played modified simulation may simulate the proposed application behavior and may be used as a specifications document.

Embodiments of the present invention provide for a system and method for validating software modifications. The system and method may automatically compare a content of a simulation automatically captured on a modified application with content of a modified simulation used as a specifications document for conveying specifications and requirements to be implemented for obtaining a desired modified application. The comparison may be for determining whether the expected application behavior as detailed in the modified simulation has been implemented in the modified application, and to indicate differences where found.

Embodiments of the present invention provide a system and method that may automatically update a simulation of a transaction executed on a computer application to reflect modifications of the computer application.

Embodiments of the present invention provide for a system and method that may automatically re-grab a simulation of a transaction executed on an application based on a previously generated transaction simulation. The re-grabbing may be performed for validation of software modifications and/or for updating a training simulation.

Figure 1:
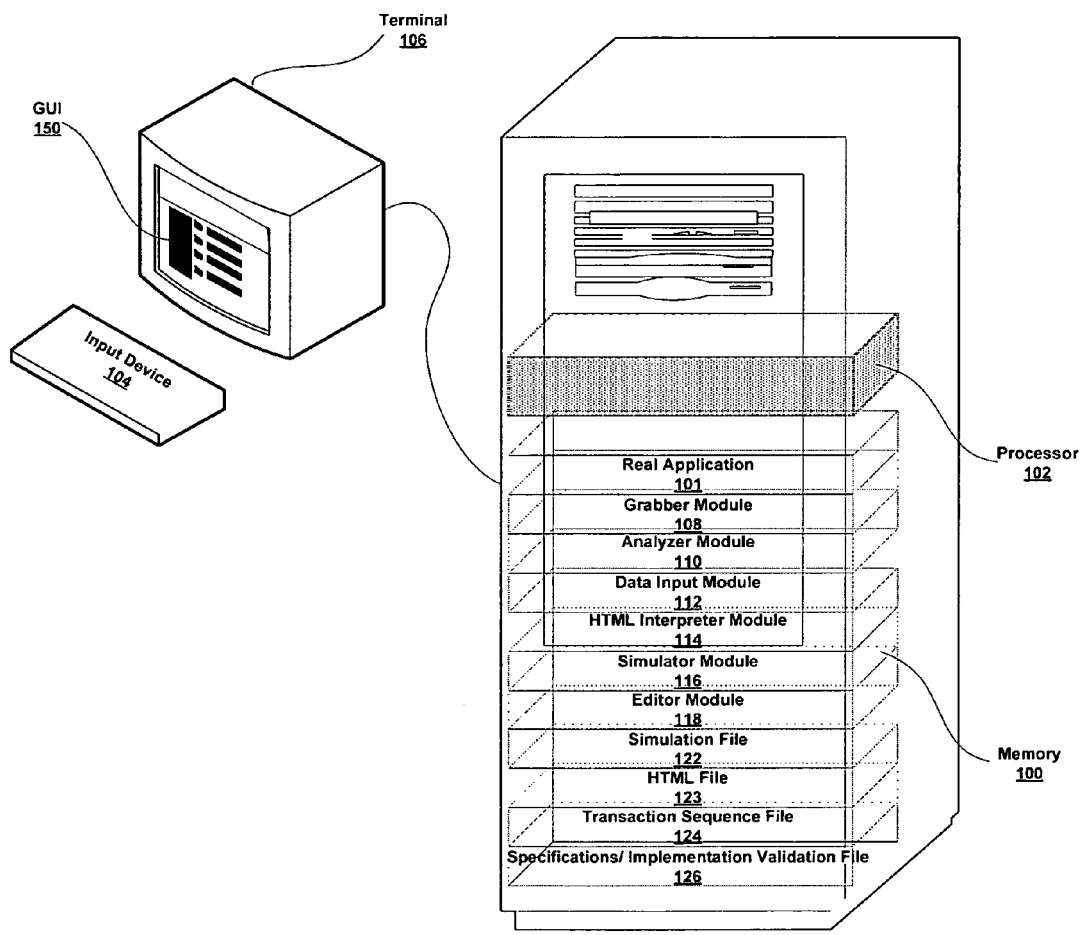
FIG. 1 is a diagram illustrating components of a system, according to an example embodiment of the present invention.

FIG. 1 is a diagram that illustrates components of an example embodiment of the present invention. A computer application 101 (also referred to herein as a "real application") that may be modified according to embodiments of the present invention may be stored in a memory 100, a hardware computer-readable medium. A processor 102 may execute the real application 101, e.g., in response to instructions input via an input device 104 by a user at a terminal 106. The input device 104 may be any suitably appropriate input device or combinations thereof. A non-exhaustive list of example input devices that may be used may include a mouse, a keyboard, and/or a touch sensitive screen. Output, e.g., generated during execution of the real application 101 or other application modules, may be provided via an output device, which may be any suitable appropriate output device. The output device may include one via which a graphical user interface (GUI) 150 may be provided, for graphical presentation of data to the user.

Other application modules may be additionally stored in the memory 100. A grabber module 108, an analyzer module 110, an automatic data input module 112, a Hyper Text Markup Language (HTML) interpreter module 114, a simulator module 116, and an editor module 118.

The memory 100 may additionally store data files that may be generated, accessed, and/or modified during execution of the application modules. These data files may include a simulation file 122, an HTML file 123, a transaction sequence file 124, and a specifications/implementation validation file 126.

Although all of the identified modules are depicted in FIG. 1 as being stored in the single memory 100, they may be distributed amongst a plurality of separate memory areas.

Although the modules are depicted in FIG. 1 as separate application modules, they may be combined into a single instruction set, e.g., including jumps. Similarly, some depicted application modules may be further divided into sub-modules that may be inter-callable for performing the overall function of the depicted application modules. Additionally, although a single terminal 106 and processor 102 are depicted in FIG. 1, execution of the various modules may be performed via a combination of processors at different terminals. For example, the simulator module 116 may be executed at a first terminal for outputting a simulation of a transaction previously implemented during execution of the real application 101 based on the simulation file 122, but the editor module 118 may be executed at a different terminal for editing the simulation file 122.

The simulation file 122, which may include data written in a Simulation Scripting Language (SML) that describes objects or events, i.e., instantiations of objects or events, captured for representing a simulation, may be generated during execution of the grabber module 108; input to the simulator module 116 for output of a simulation of a transaction performed during a previous execution of the real application 101; modified during execution of the editor module 118; and/or input to the grabber module 108 for the grabber module 108 to determine at which states to capture objects of the real application 101 and which objects of the application 101 on which to trigger events during execution of the real application 101 for the re-grabbing procedure. Instead of input of the simulation file 122 to the simulator module 116, the simulation file 122 may be input to the interpreter module 114 for generation of the HTML file 123, which may be an equivalent of the simulation file 122, but which may be processed as a conventional HTML file, e.g., using an Internet browser, for output of the simulation.

The transaction sequence file 124 may be generated, e.g., by a user via any suitably appropriate text editor and may be input to the grabber module 108 for the grabber module 108 to determine, during an automatic grab procedure, which objects of the real application 101 to capture during execution of the real application 101. For example, the transaction sequence file 124 may be used by the grabber module 108 during an initial transaction capture, and the simulation file 122 may be used during a subsequent transaction capture, as will be described below. Generation of the transaction sequence file 124 may require the user to follow predefined rules so that the transaction sequence file 124 may be interpreted by the grabber module 108. In one example embodiment the transaction sequence file 124 may be an equivalent of a simulation file 122 generable during a grabbing procedure executed during execution of the real application 101.

The grabber module 108 may generate the simulation file 122 based on the captured objects and data using SML. With SML, captured objects may be identified by an SML name and properties associated with the name. The name may be based on an object name used by the real application 101. It may be required for the grabber module 108 to be tailored to the particular real application 101 that is the object of the grab. Further the real application 101 may instantiate a plurality of graphical component classes belonging to various user interface architectures. Therefore, in one example embodiment of the present invention, the grabber module 108 may include one or more architecture-specific grabber extensions for recognizing the items and states of corresponding graphical component classes. It may occur, however, that the real application 101 includes one or more architectures for which the grabber module 108 does not include a corresponding grabber extension. If the grabber module 101 determines that it does not recognize all of the objects included in a particular state that is to be captured, the grabber module may record a snapshot of for each of the unrecognized instantiated component classed, instead of capturing the objects themselves.

The SML name may be further defined by any parent object name. For example, if a button is placed within another object (the parent object), the object's SML name may include its own name appended to the SML name of its parent object. A non-exhaustive list of example properties that may be associated with the objects includes size, font, position, color, etc. One or more values may be associated with the properties. Additional data that may be included in the simulation file 122 using SML may include events, which may be associated with objects. An event may be a user action. A non-exhaustive list of example events that may be associated with objects include mouse clicks, drag-and-drop, and keystrokes. An event may be identified by the name of the object with which it is associated, a description of the causal action applied to the object (mouse click, keystroke, etc.), and further information depending on the type of object and event. For example, a Drag&Drop of a listview item onto a treeview node item may require additional information, such as the line of the listview which is dragged, and the treeview object and its node item where the dragged item is dropped. An event may be associated with an object task, which may be a description of a responsive action to perform in response to occurrence of the causal action, e.g., an action to perform to modify the object.

An example SML described Font dialog box object captured from the application NOTEPAD.EXE may be:

[Private "Object,Label:Static@442/Form:Notepad@Untitled"]
"Left","165";
"Width","174";
"Top","158";
"Height","70";
"Enabled","Yes";
"Visible","Yes";
"Font","Ms Sans Serif,8,Regular";
"Align","Center";
"Caption","Sample";
"TabStop","No";

An example SML described object task to perform in response to a user action for creating the Font dialog box may be:

[Private "Action, 10"]
"Exception1","Form:Notepad@Untitled";
"Event1","OnMenu";
"DataA001|T","&Font ...";
"DataA002|T","F&ormat";
"ActionContext01","Form:Notepad@Untitled";
"Task001|Load","Form:#32770@Font/Form:Notepad@Untitled";
"Task002|Load","Label:Static@440/Form:#32770@Font/Form:
    Notepad@Untitled";
"Task003|Load","ComboBox:ComboBox@470/Form:#32770@Font/
Form:
    Notepad@Untitled";
"Task004|Load","Label:Static@441/Form:#32770@Font/Form:
    Notepad@Untitled";
"Task005|Load","ComboBox:ComboBox@471/Form:#32770@Font/
Form:
    Notepad@Untitled";
"Task006|Load","Label:Static@442/Form:#32770@Font/
Form:
    Notepad@Untitled";

-continued

"Task007|Load","ComboBox:ComboBox@472/Form:#32770@Font/
Form:
    Notepad@Untitled";
"Task008|Load", "GroupBox:Button@431/Form:#32770@Font/Form:
    Notepad@Untitled";
"Task009|Load","Label:Static@445/Form:#32770@Font/Form:
    Notepad@Untitled";
"Task010|Load","Label:Static@446/Form:#32770@Font/Form:
    Notepad@Untitled";
"Task011|Load","ComboBox:ComboBox@474/Form:#32770@Font/
Form:
    Notepad@Untitled";
"Task012|Load","PushButton:Button@1/Form:#32770@Font/
Form:
    Notepad@Untitled";
"Task013|Load","PushButton:Cancel/Form:#32770@Font/Form:
    Notepad@Untitled";
"Task014|Set","Form:Notepad@Untitled";
"Task14|sub|N|MenuNodeState",
    "EEEEESEESEEDSDDEDSDDEDSEEEEEEDEESE";
"Task14|sub|N|Enabled","No";
"Task015|Select","Edit:Edit@f/Form:Notepad@Untitled";

Some events may include a causal action applied to a first object and may be associated with an object task to be performed on another object. For example, clicking a button may cause display of a new window.

Figure 2:
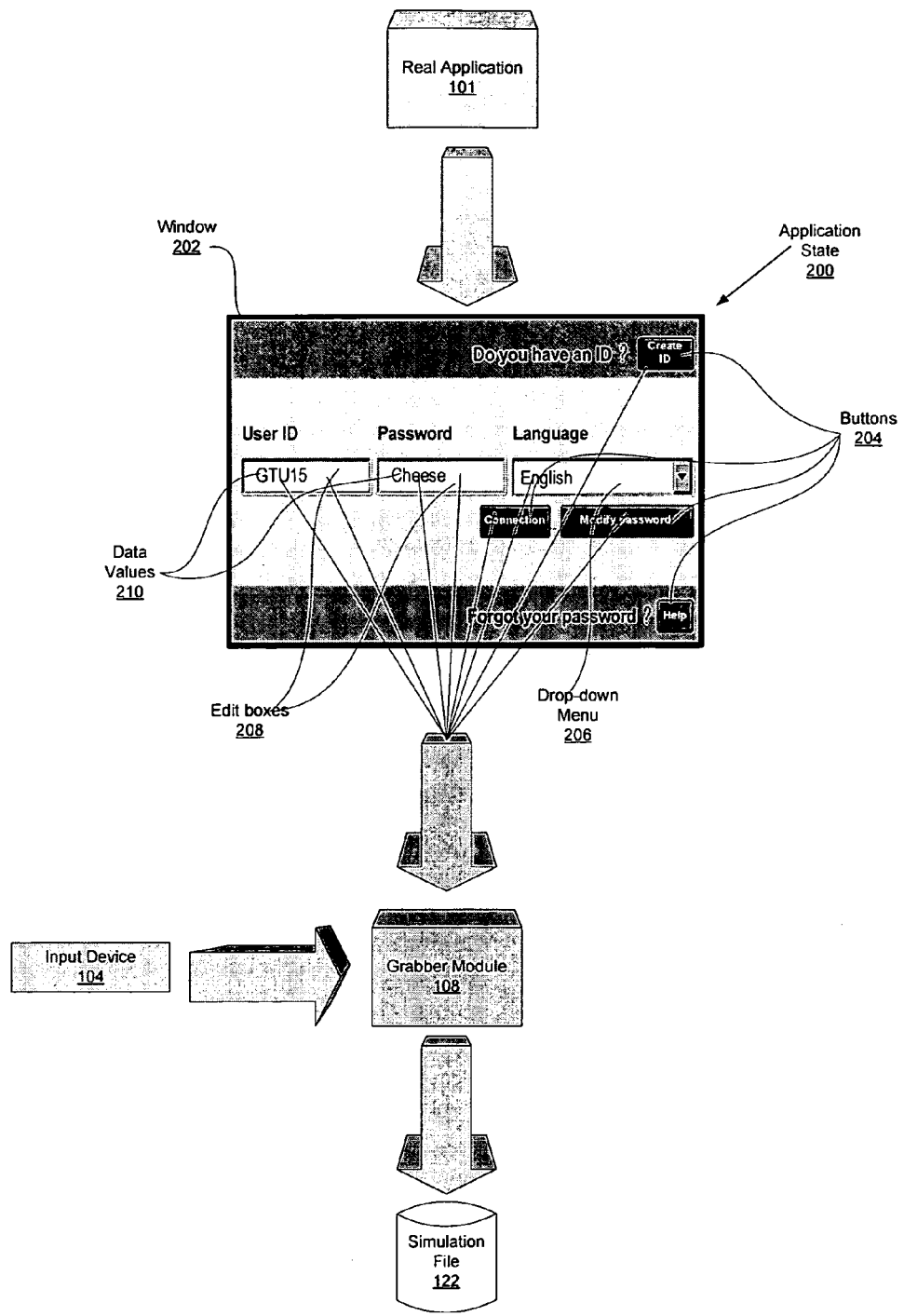
FIG. 2 is a data flow diagram that illustrates a procedure that may be performed for generation of a simulation file, according to an example embodiment of the present invention.

FIG. 2 is a data flow diagram that illustrates a procedure that may be performed for generation of the simulation file 122, according to an example embodiment of the present invention. The real application 101 may be executed. During execution, the real application 101 may enter different application states. One or more states may be represented graphically, for example, via the GUI 150. An example application state 200 is graphically represented in FIG. 2 as a plurality of graphical objects, including a window 202, buttons 204, a drop-down menu 206, and edit boxes 208. The graphical objects may include data values 210, e.g., user-entered text. Similar to a debugger, the grabber module 108 may interrupt execution of the real application 101 to capture the objects and data values of an application state. For example, during execution of the real application 101, the grabber module 108 may be loaded for invoking an injection mechanism to capture objects and data of the real application 101. The set of graphical objects that may be captured is not limited to those identified in FIG. 2, and may include other graphical objects, such as a check box, label, tool bar, tab control, and all graphical objects displayed by the real application.

Figure 3:
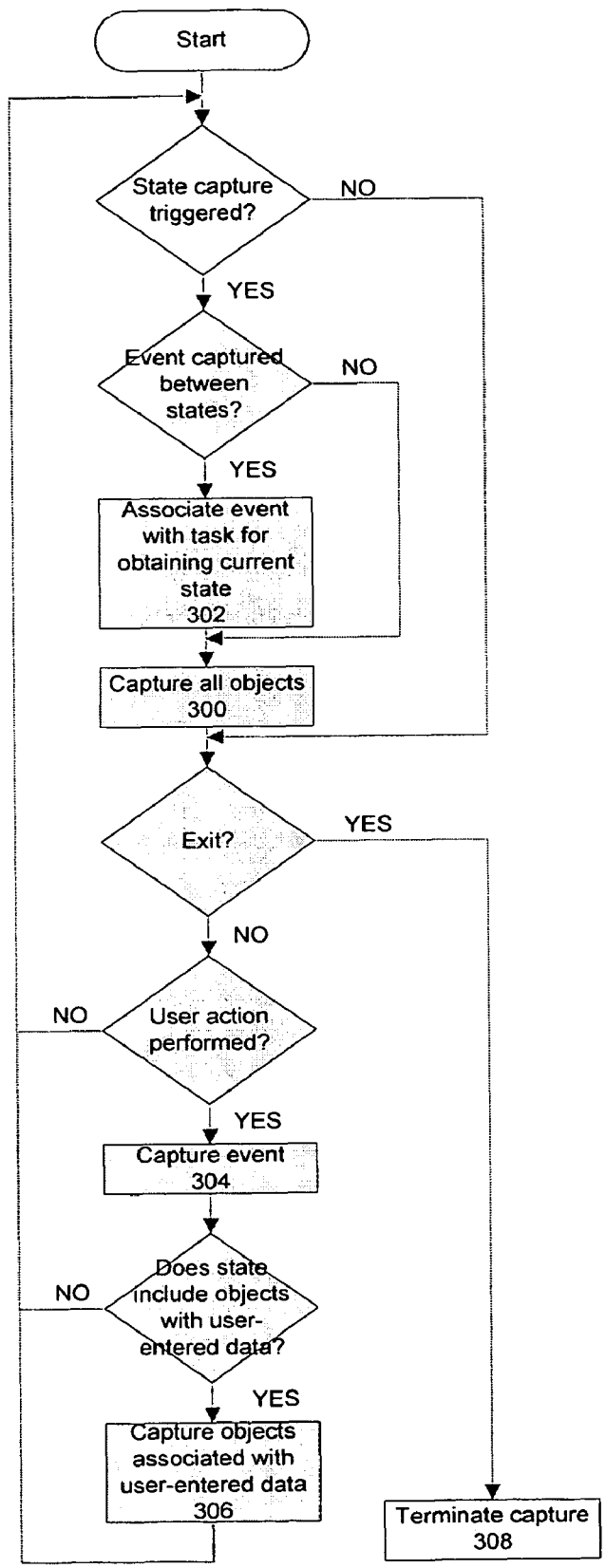
FIG. 3 is a flowchart that illustrates a user-interactive/semi-automatic grab procedure that may be performed for capturing graphical objects, according to an example embodiment of the present invention.

FIG. 3 is a flowchart that illustrates a user-interactive/semi-automatic grab procedure the grabber module 108 may perform for capturing graphical objects, according to an example embodiment of the present invention. The capturing of graphical objects may be performed in response to user input via the input device 104. For example, pressing the ctrl key on a keyboard may be interpreted by the grabber module 108 as a trigger to capture a state of the real application 101 being monitored by the grabber module 108. Accordingly, if the user trips the trigger for capturing a state of the real application 101, the grabber 108 may, at 300, capture all objects of the state of the real application 101 at the time of the trigger trip. As described below, an event may have been captured prior to the triggering of the state capture. Therefore, if the state capture triggering is not the first such triggering, and if an event had been previously captured, it may be required to perform 302 for association of the previously captured event with a calculated change in state, as described below. Further, in one example embodiment of the present invention, 302 may be performed even at the first triggering of a state capture. According to this embodiment, a default action, referred to herein as an "on-initialize" action, may be assigned to the initial captured state.

With respect to events, when the user performs an action, the grabber module 108 may, at 304, responsively detect and capture the corresponding SML event, even without an explicit user-instruction to capture the event. This may be further applied to actions performed by the real application 101 internally, rather than by the user. For example, the real application 101 may itself trigger an internal action in response to a clock time-out or other prompt. In an embodiment of the present invention, these actions, too, may be treated as a user action. The SML event may associate the user action with the objects on which the action was performed. However, association of the event with an object task may be deferred until after a next state capture, and may be performed at 302. If an event had been captured subsequent to a previously captured state and prior to the currently captured state, then, after the current capture, the grabber module 108 may, at 302, associate the event with an object task to be performed for changing a state from the previously captured state to the currently captured state. This may require the grabber module 108 to compare the two states to determine differences between the two states.

It may occur that the user performs multiple actions between triggering state captures. For example, after capture of a state representing a particular displayed screen, the user may separately interact with multiple controls of the screen, without triggering a new state capture until after one of the later control interactions. In response to each user action, the grabber module 108 may perform 304. In one example embodiment of the present invention, after any two consecutive actions without a state capture, the grabber module 108 may delete the first one of the corresponding captured events, so that at a next state capture, only one event may remain for association with an object task. In an alternative example embodiment, the grabber module 108 may automatically associate the first one of the consecutively captured actions with the state change. In yet an alternative example embodiment of the present invention, the grabber module 108 may record all consecutively captured events, and, after a triggering of a state capture (or after each event subsequent to the first of the consecutively captured events), output an instruction to the user to choose one of the events for association with the object task for changing from the previously captured state to the current (or next) state capture. In a variant of the above alternative embodiments, the grabber module 108 may initially output the instruction to the user to choose one of the actions, but, if the user continues to guide the real application 101 to a next state, the grabber module 108 may use a default selection of either the first or last captured action. In yet another alternative embodiment, while the grabber module 108 may associate one of the multiple actions with the state change, the grabber module 108 may also continue to store all of the captured actions, e.g., so that the simulation file 122 may be used for output of a simulation in which all the actions are performed, but some of them without a corresponding state change.

With respect to data entries, the grabber 108 may automatically, i.e., without receiving a user instruction, capture the entries prior to processing of the entered data and/or prior to a state change, even without user input for triggering a state capture. For example, in response to each user action performed in the environment of the real application 101, the grabber module 108 may capture all data entries present in the currently existing application state, prior to the processing of the data entries (i.e., prior to processing the user action in which the data might be processed) by the real application 101, even without a user capture prompt.

Thus, the data capture may be performed if an action is performed by the user. If (a) this condition is satisfied and (b) the state of the real application 101 preceding performance of any processes by the real application 101 in response to the user action includes objects that have or are associated with user-entered data, then the grabber module 108 may, at 306, capture all of the objects of the state that are associated with user-entered data, prior to performance by the real application 101 of the responsive process, and, therefore, prior to processing the user-event data by the real application 101.

Once the grabber module 108 completes performance of operations responsive to a user action or state capture trigger, the grabber may loop back to continue to wait for another user action or state capture trigger. If the user terminates the real application 101 or otherwise indicates an instruction for exiting the grabber module 108, the grabber module 108 may, at 308, terminate the capture procedure.

It will be appreciated that the precise operation sequence of FIG. 3, in which the capture may be performed, is shown by way of example only. For example, an exit may occur via an interrupt at any point in the sequence of FIG. 3. Further, in one example embodiment, 302 may be performed subsequent to an object capture at 300. Other sequence changes may also be implemented.

Figure 4:
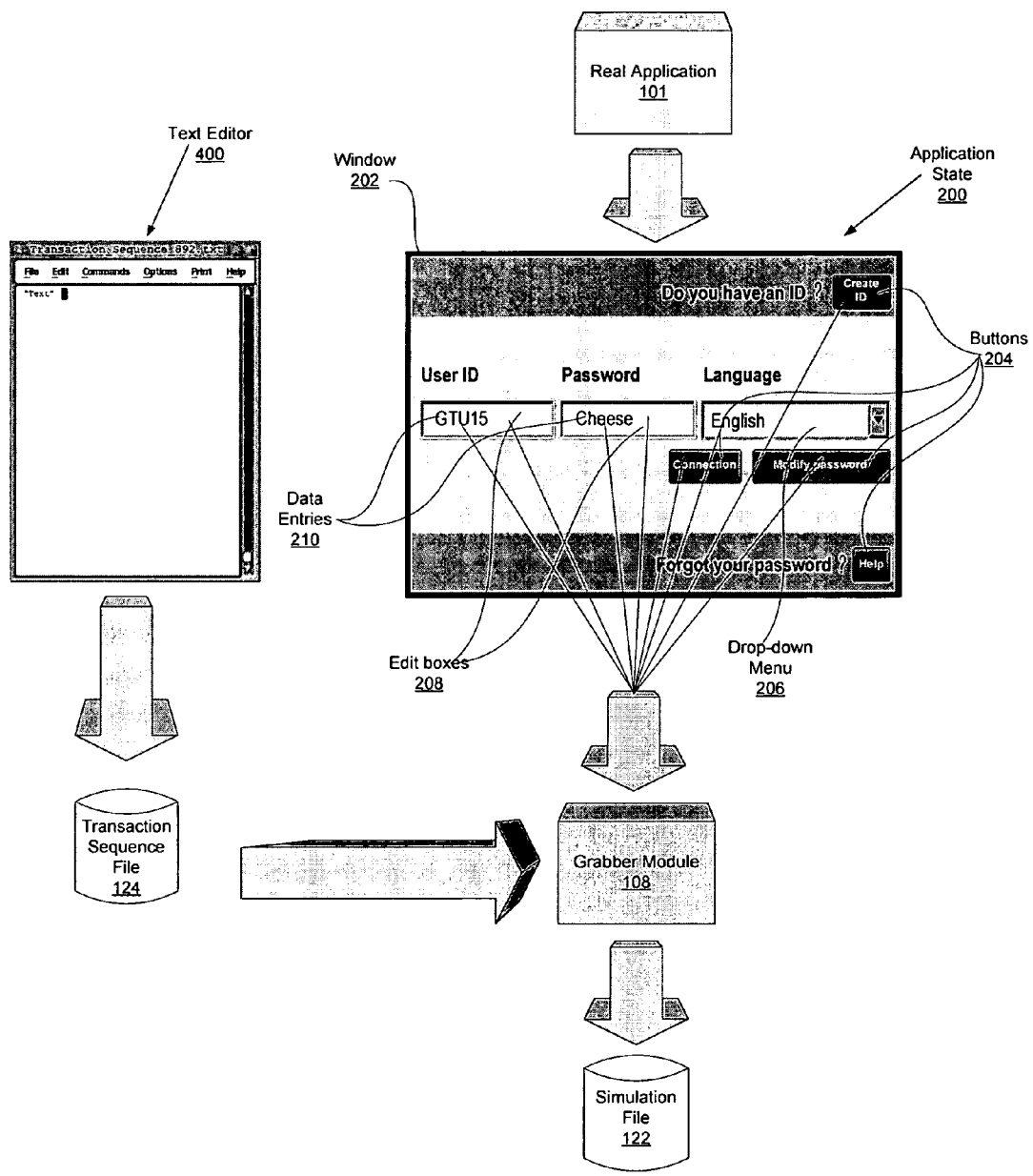
FIG. 4 is a data flow diagram that illustrates a procedure that may be performed for generation of a simulation file based on an automatic grab, according to an example embodiment of the present invention.

The particular transaction to capture for providing a simulation may require forethought. For example, a user may desire a simulation that simulates aspects of the real application 101 that the user believes requires most change. Thus, it may be required for a user to step through a trial-and-error process of performing various steps until the user determines the precise sequence of steps that should be performed. Making the correct decision regarding the steps to perform and the states to capture may be difficult while running the grabber module 108. In an alternative example embodiment of the present invention, as shown in FIG. 4, a user may use a text editor 400 to generate the transaction sequence file 124 prior to running the grabber 108. The transaction sequence file 124 may describe a sequence of operations, including data entry, to be performed in the environment of the real application 101, and which may also include capture instructions placed at various points of the transaction sequence file within the description of the sequence of operations. The transaction sequence file 124 may be passed in parameter to the grabber module 108. In accordance with the transaction sequence file 124, the grabber module 108 may run the real application 101 and call the automatic data input module 112 to implement a hook function to interact with the real application 101 to perform the operations described in the transaction sequence file, as would a user. The operations may include data entry operations with associated data, as well as actions in the real application 101, doing so by taking automatic control of the input device. During operation of the real application 101, at various points of the sequence of operations where a capture instruction is included in the transaction sequence file 124, the grabber module 108 may capture the graphical objects. The grabber module 108 may also capture data in the same manner discussed above, even without a capture instruction.

Figure 5:
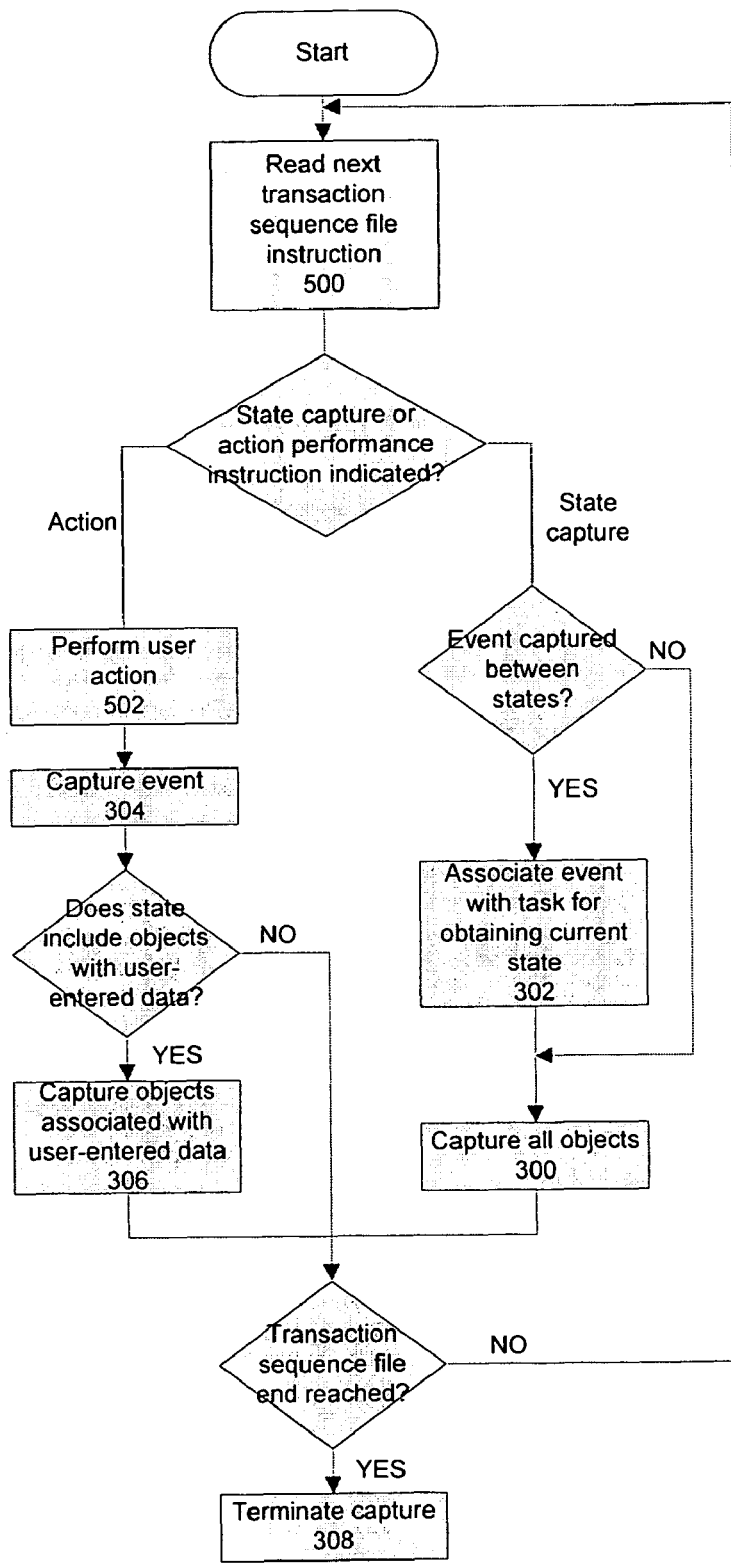
FIG. 5 is a flowchart that illustrates an automatic procedure a grabber module may perform for capturing graphical objects, according to an example embodiment of the present invention.

FIG. 5 is a flowchart that illustrates an automatic procedure the grabber module 108 may perform for capturing graphical objects, according to an example embodiment of the present invention. That which is shown in FIG. 3 is labeled in FIG. 5 as in FIG. 3. At 500, the grabber module 108 may read the next instruction in the transaction sequence file. It is noted that it is not required for the transaction sequence file 124 to include explicit state capture or user action (or other action)

performance instruction. For example, as will be discussed below, in one example embodiment of the present invention, instead of an instruction set, the transaction sequence file 124 may be an equivalent to a simulation file. The simulation represented by the simulation file may be interpreted by the grabber module 108 as instructions for performance of either a state capture or an action.

If the next instruction is a state capture instruction, the grabber module 108 may proceed to 300 (or 302 if event had been previously captured). Otherwise, the grabber module 108 may proceed to 502. At 502, the grabber module 108 may perform the user action automatically. This may include automatic data entry. For example, the grabber module 108 may call the automatic data input module 112 at 502 for performing the data input. After performance of all operations associated with the read instruction, if the end of the transaction sequence file has been reached, the grabber module 108 may, at 308, terminate the automatic object capture. Otherwise, the grabber module 108 may loop back to read the next transaction sequence file instruction at 500.

The simulation file 122 may be input to the simulator module 116, which may then interpret the SML instructions, including identifications and properties of objects, events, and object tasks. It is not required for the simulation file 122 itself to include a complete graphical description of objects to be included in the simulation. Instead, a library of object graphical descriptions (referred to herein as an "SML item library") may be maintained and accessed by the simulator module 116. The SML item library may be updated, e.g., manually, for inclusion of additional items. In one example embodiment, the grabber module may automatically update the SML item library if it captures an object in the real application 101 that is not already included in the SML library. Aside from graphical descriptions, the SML library may also include descriptions of types of properties that may be associated with the various items of the library and/or the possible values of each, or one or more, of the properties.

Based on its interpretation, the simulator module 116 may display in sequence at the GUI 150 each state and any intervening action and/or data entry defined in the simulation file 122. For example, for a first indicated state, the simulator module 116 may display all identified objects having the properties identified in the simulation file 122. The simulator module 116 may then perform an indicated action. For example, if a captured event indicates a press of a button, the simulator module 116 may simulate the button press and perform the indicated responsive object task for obtaining the following captured state. In an alternative example embodiment, the simulator module 116 may be user interactive and may wait for a user to perform the button press, in response to which the simulator module 116 may perform the responsive object task. Actions of the real application 101 that are not indicated in the simulation file 122 may be inoperative.

In an example embodiment of the present invention, the editor module 118 may be implemented for editing a simulation. In one example embodiment, the editor module 118 may be called from within an environment of the simulator module 116. For example, during the simulation output by the simulator 116, a user may select a control for calling the editor module 118. In one example embodiment, if the editor module 118 is called from within the environment of the simulator 116 during simulation output at a particular reproduced application state, the editor module 118 may, in response, provide a modifiable representation of the particular state (from which the user may navigate to other states for modification of the other states).

Figure 6:
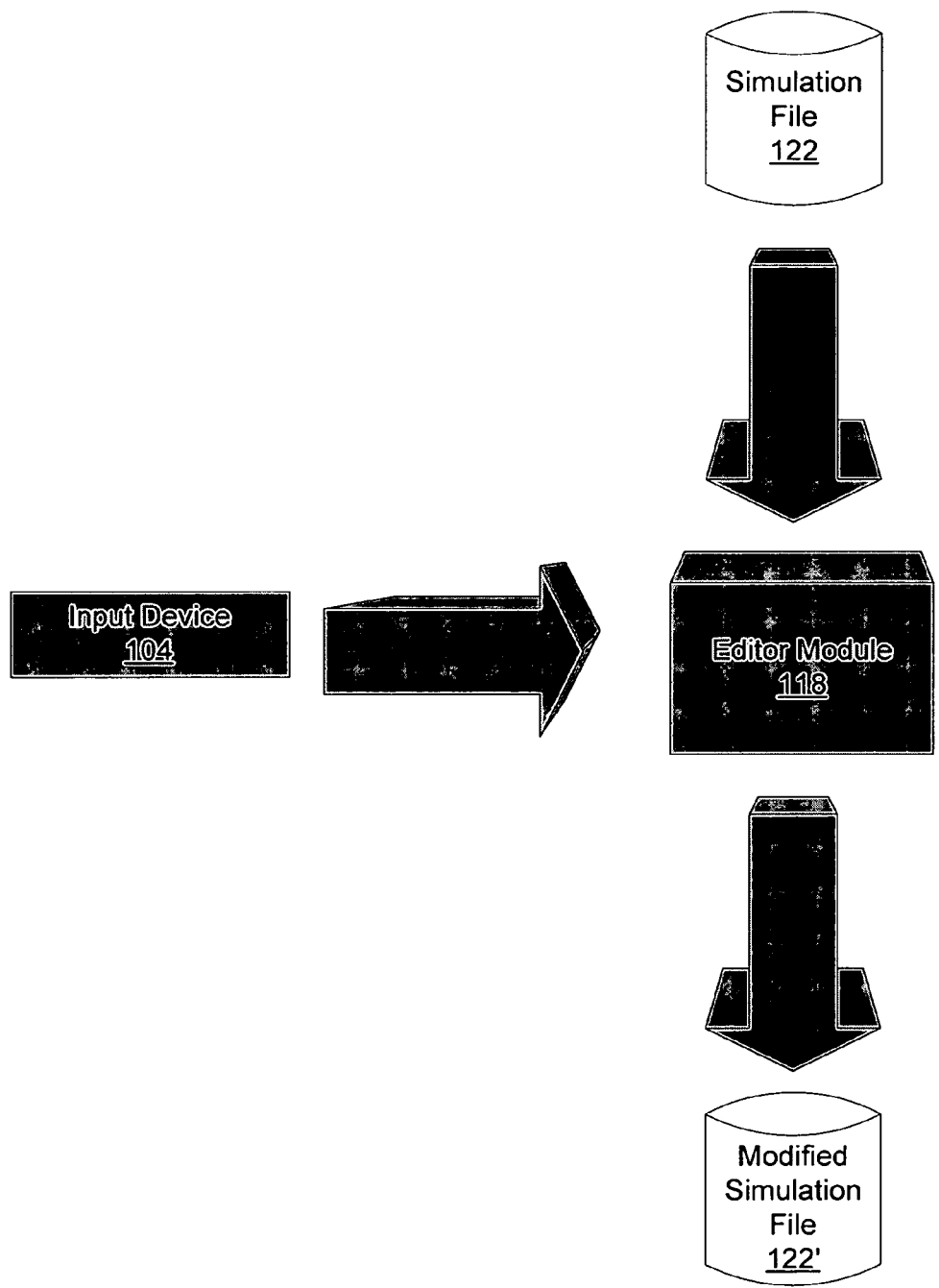
FIG. 6 is a data flow diagram that illustrates a procedure for editing a simulation, according to an example embodiment of the present invention.

FIG. 6 is a data flow diagram that illustrates editing of a simulation. The simulation file 122 may be passed to the editor module 118. The editor module 118 may output the simulation file 122 to a user. Via the input device 104, the user may enter instructions to the editor module 118 for modifying the simulation file 122. The editor module 118 may, in response to the user instructions, modify the simulation file to produce a modified simulation file 122'.

Figure 7:
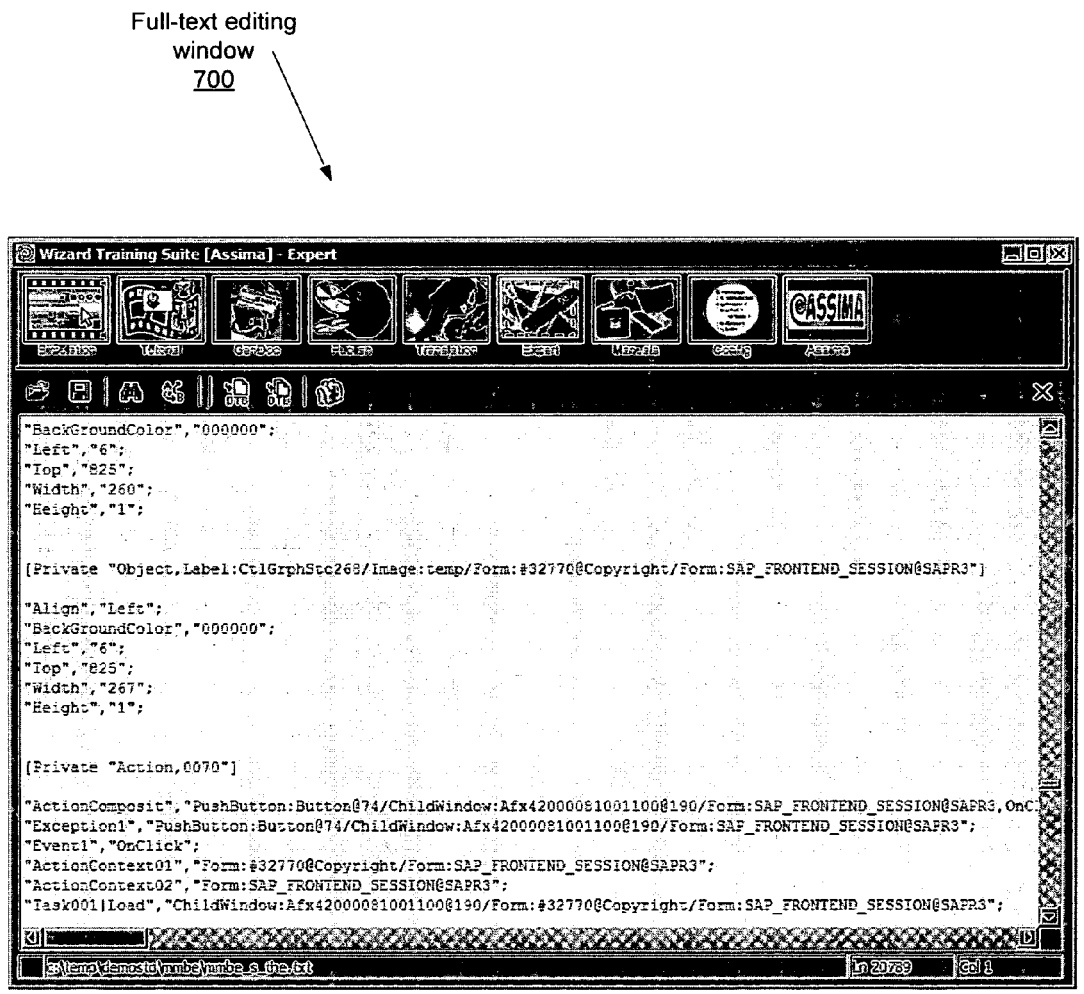
FIG. 7 is a full-text editing window, according to an example embodiment of the present invention.

In an example embodiment of the present invention the editor module 118 may output the text of the simulation file 122 so that the user may modify the simulation by editing the text (referred to herein as "full-text edit mode"). FIG. 7 is an example full-text editing window 700, including text of a simulation file that may be displayed and edited by a user.

Figure 8:
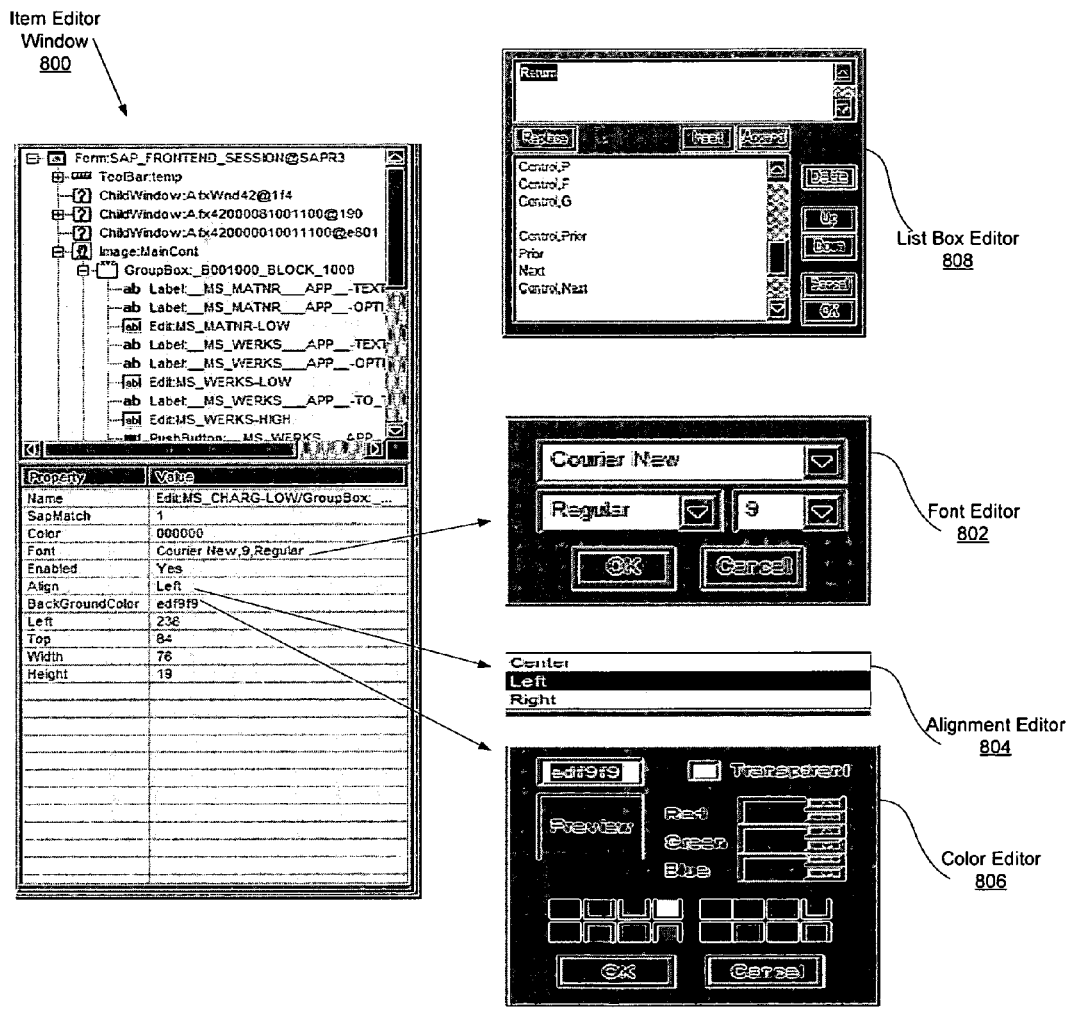
FIG. 8 shows an item editor window and graphical edit controls, according to an example embodiment of the present invention.

In an example embodiment of the present invention, the editor module 118 may output a list of the objects, events, and/or object tasks included in the simulation file 122 so that the user may select and edit their properties (referred to herein as "item-property edit mode"). When an object, event, and/or object task is selected, the editor module 118 may indicate the selected item's properties so that the user may edit the selected item, e.g., via text entry or a graphical edit control. FIG. 8 shows an example item editor window 800 and graphical edit controls including a font editor 802, an alignment editor 804, and a color editor 806 that may be used to edit properties of the item selected in the item editor window 800. The graphical edit controls of FIG. 8 are shown by way of example only. Other edit controls may be provided instead of or in addition to (e.g., for editing item types having properties different than the one selected in the item editor window 800) those shown in FIG. 8. For example, a list box editor 808 shown in FIG. 8 may be provided for editing of elements of a list box.

Figure 9:
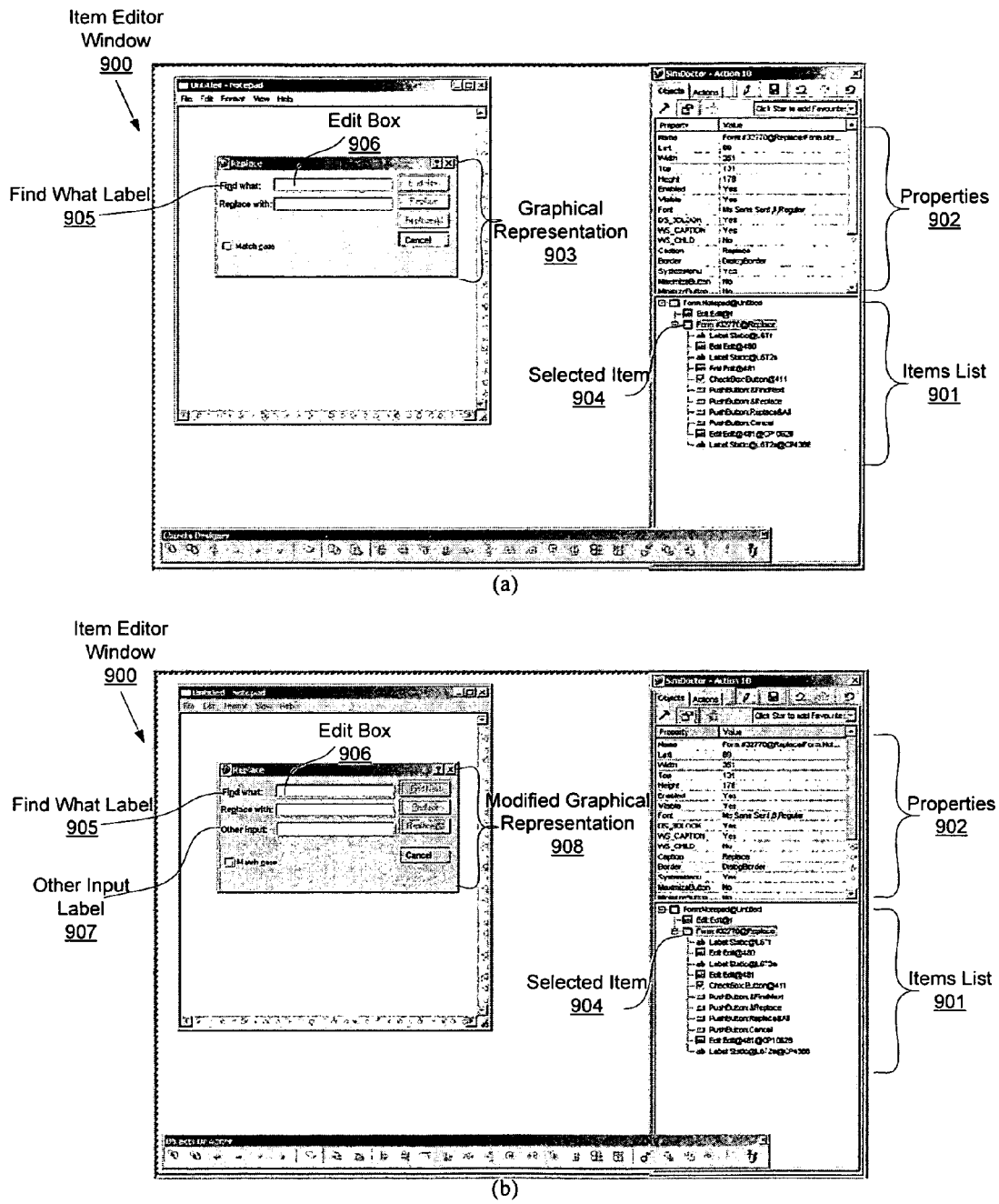
FIG. 9 illustrates an object edit using the item editor window, according to an example embodiment of the present invention.

For graphical editing of items, the editor module 118 may display a graphical representation of the selected item. For example, FIG. 9 shows an example item editor window 900 which includes an items list 901, listing items, for example, of a selected state, and a graphical representation 903 of a selected one of the items 904. The editor module 118 may provide for editing of a selected item via user interaction with listed properties 902 of the selected item 904 and/or via interaction with the graphical representation 903 of the selected item 904, which may allow for modification of objects and associated properties, events, and or tasks, directly on a simulation interface. The editor module 118 may update one of the listed properties 902 and the graphical representation 903 in response to user interaction with the other of the listed properties 902 and the graphical representation 903. For example, if the user copies the "find what" label 905 and the corresponding edit box 906, shown in part (a) of FIG. 9, pastes it at another location, and modifies the pasted label to be an "other input" label 907 to obtain a modified graphical representation 908 of the item, shown in part (b) of FIG. 9, the editor module 118 may update the properties 902 so that it corresponds to the modified graphical representation 908.

In an example embodiment of the present invention, aside from editing existing items of the simulation file 122, new items may be written into the simulation file 122 via the editor module 118. For example, with knowledge of items defined in the SML item library, a user may insert text into the simulation file 122 that indicates placement of a new object, a new event associated with an existing or new object, and/or a new object task associated with an existing or new event. Additionally, with knowledge of the SML language structure, a user may define an entirely new item in the SML item library. In one example embodiment, an entirely new item may be graphically defined in the editor module, e.g., by drawing a new object and editing property fields. The editor module 118 may update the SML library to include the newly defined object.

Figure 10:
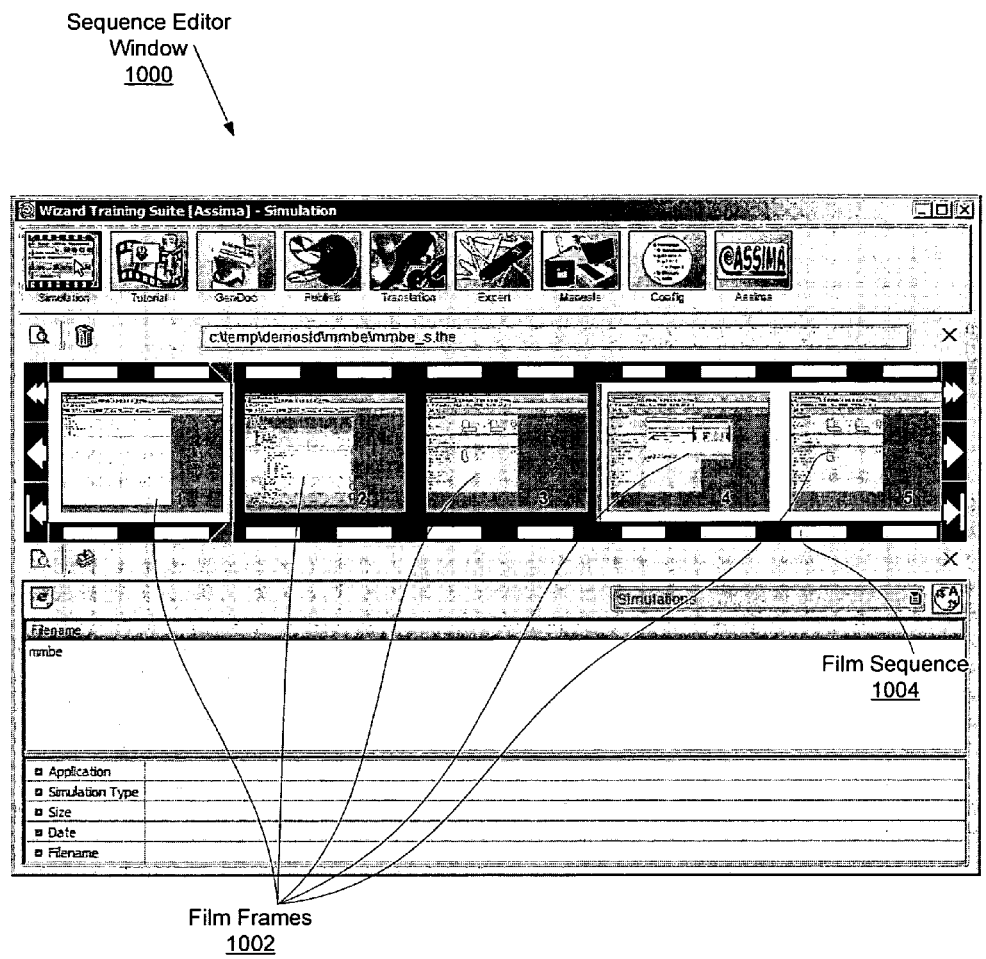
FIG. 10 is an example sequence editor window, according to an example embodiment of the present invention.

In an example embodiment of the present invention, the editor module 118 may display a state sequence of the simulation file 122 so that the user may modify the sequence in which the states occur (referred to herein as "sequence edit mode"). For example, if the user modifies a sequence of three consecutive states so that the previously indicated third state occurs immediately following the first state, the editor module 118 may, in response, update the sequence in the simulation file 122, and may also update an event associated with an object of the first state so that it is associated with an object task for changing the first state to the third state, instead of with the object task for changing the first state to the second state. FIG. 10 is an example sequence editor window 1000 in which are displayed a series of screen views, each representing a corresponding application state. In one example embodiment, the screen views may be displayed as a series of film frames 1002 forming a film sequence 1004, as is shown in FIG. 10. For editing the state sequence of the simulation, the user may modify the sequence in which the corresponding screen views are displayed in the sequence editor window 1000. For example, the editor module 118 may provide a drag-and-drop feature via which a screen view, or group of screen views, may be selected and dragged to a different location of the screen view sequence. In one example embodiment of the present invention, two or more simulations (or simulation versions, where a new simulation version is generated by modification of an older version, for example) may be concurrently displayed, so that one or more screen views of one simulation (or version) may be copied to a position in the screen view sequence of the other simulation (or version).

Different users of a group working to improve a single simulation file 122 may have an interest in different modifications to the simulation file 122. It may be desirable for the users to refrain from entering their desired changes until others of the group are notified of and/or approve the changes. For example, a change desired by a first user may affect that which a second user can or should change. Additionally, one desiring a change might not have the authority to enter the change until first receiving approval by a superior. Additionally, it may occur that one who desires a particular change does not possess the necessary skills or have time for entering the change. The users might therefore interact with each other to come to an agreement over what to change before modifying the simulation. There may be other reasons for discussion between members of a development team regarding desired or already entered changes to the simulation file 122.

In an example embodiment of the present invention, the editor module 122 may provide for entering of an electronic post-it-note and appending it to an item of the simulation file 122. The item to which the electronic note may be appended may be, e.g., an object, an event, or an object task. In one example embodiment, an electronic note may be appended to the simulation file 122 even without an association of the electronic note with a particular item of the simulation file 122. The electronic note may include a text entry box for user-entered text. The electronic note may facilitate an organized discussion between members of a development team. For example, a user may enter text regarding a simulation item of the simulation file 122 into an electronic note appended to the simulation item in the simulation file 122. Such text may, for example, flag that the item was newly added or modified, or that an un-entered modification of the item is desired.

In one example embodiment of the present invention, the electronic node may include multiple layers. For example, a user at a first time may create and append to an item an electronic note having one layer. Subsequently, another layer may be added, for example by another user or by the originating user at a different time. Each layer may include a corresponding text entry box. Accordingly, different comments regarding a single item may be combined into a single electronic note, but may be separately selectable and viewable. In one example embodiment, in response to an update of an electronic node to include a new layer, the editor module 118 may automatically generate an e-mail notification of the newly added layer, and transmit it to e-mail addresses to which the editor module 118 has access and that are associated with contributors to the electronic note, e.g., to each layer originator. In one example embodiment, the editor module 118 may transmit such an e-mail for any update to the electronic note and/or to an object, event, and/or object task with which the electronic note is associated.

Figure 11:
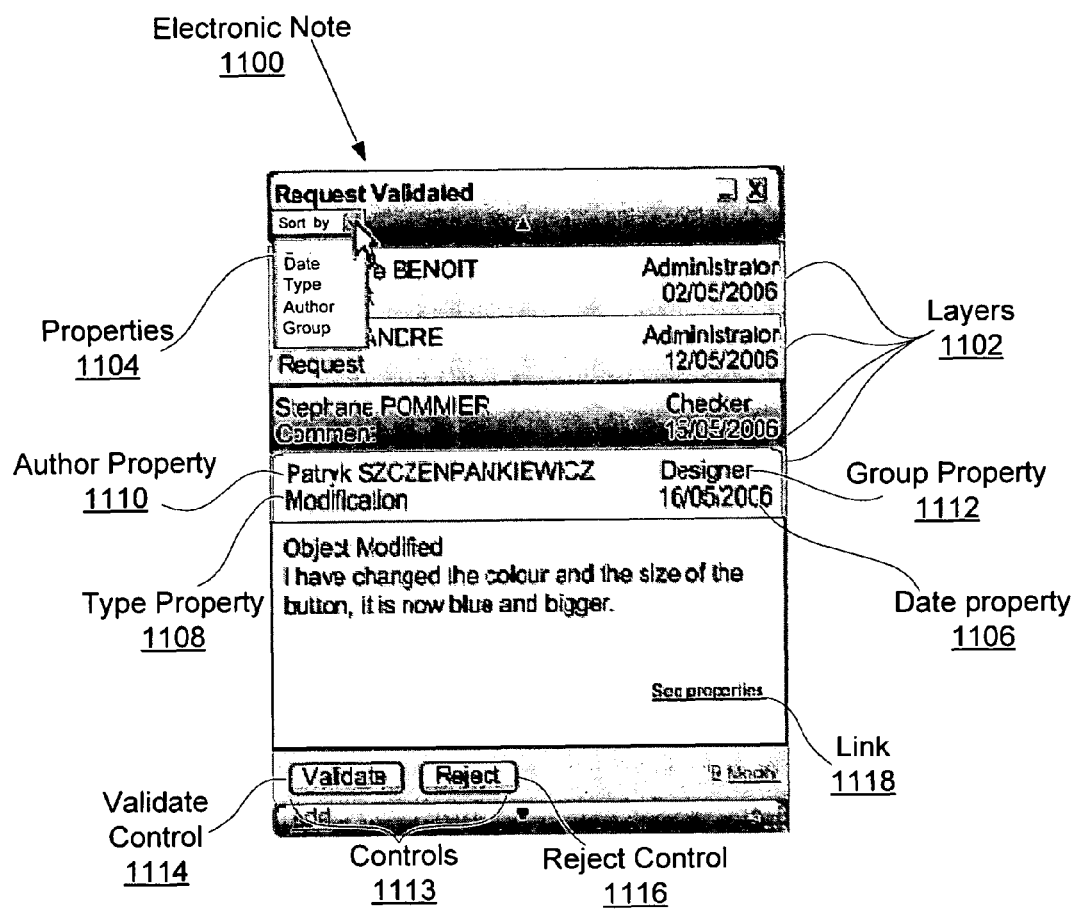
FIG. 11 illustrates an example electronic note, according to an example embodiment of the present invention.

FIG. 11 shows an example electronic note 1100 that may be appended to an item of the simulation file 122, according to an example embodiment of the present invention. The electronic note 1100 of FIG. 11 includes four example layers 1102. In one example embodiment, layers of an electronic note may be associated with a plurality of properties. For example, layers 1102 of the electronic note 1100 are associated with one or more of properties 1104 that include: a date property 1106; a type property 1108, that may indicate, e.g., whether the layer includes an item request, a comment regarding an item (e.g., a requested or modified item), or an indication of an item modification or addition; an author property 1110, and a group property 1112, (which, for clarity, are labeled only with respect to one of the layers 1102 of FIG. 11). In an example embodiment of the present invention, the editor module 118 may provide for sorting the layers of an electronic note by one or more of the layer properties.

In an example embodiment of the present invention, the editor module 118 may add controls 1113 to an electronic note, such as a validate control 1114 and a reject control 1116, so that a user, e.g., one having the requisite authority, may indicate that a proposed new item or modification of an item is accepted or rejected. In one example embodiment, if a user triggers the reject control 1116, the editor module 118 may automatically undo the edit of the item with which the electronic note is associated or disallow the edit until the rejection indication is reversed.

In an example embodiment of the present invention, a plurality of electronic notes may be appended to a single item. Each of the plurality of electronic notes may be associated with different properties of the item. For example, a first electronic note may be associated with a first configuration of an item according to which text included in the item is of 12 pt. size, and a second electronic note may be associated with a second configuration of the item according to which text included in the item is of 10 pt. size. Where conflicting electronic notes are appended to an item, the editor module 118 may set both electronic notes to a validated state. For example, in response to triggering of the validate control 1114 of the first electronic note, the editor module 118 may automatically set the item's properties according to the validated electronic note, and set the second electronic note to a rejected state. In one example embodiment, the validate control 1114 of the second electronic note may be disabled. In an alternative embodiment, the editor module 118 may provide for the toggling of states between the two electronic notes, so that subsequent to validation of the first electronic note, the editor module 118 may invalidate the first electronic note and validate the second electronic note in response to triggering of the validate control 1114 of the second electronic note. The preceding validation/rejection rules according to which the editor module 118 may operate are described by way of example only. Other validation/rejection rules may be applied.

In one example embodiment of the present invention, an electronic note appended to an item of a simulation file 122 may be displayed when the simulator module 116 outputs a simulation based on the simulation file 122, i.e., during a simulation output mode. In an alternative example embodiment, the system and method may provide for viewing of an electronic note only when viewing the simulation file 122 via the editor module 118, i.e., during a simulation edit mode. In a variant of the above, the system and method may provide for selection by the user of a viewing mode applicable to the electronic node. The viewing modes may include, one in which the electronic note is output only during the simulation output mode, one in which the electronic note is output only during the simulation edit mode, and one in which the electronic note is output in both of the simulation output and simulation edit modes. For example, the editor module 118 may provide for an electronic note originator to set a visibility property (also referred to herein as an "output mode property") of the electronic note.

In an example embodiment of the present invention, the output of the electronic note may be in accordance with the object with which the electronic note is directly or indirectly associated. For example, the editor module 118 and/or the simulator module 116 may display an electronic note in a vicinity of a displayed object with which the electronic note is associated. For example, if the electronic note is directly associated with an event or object task, the electronic note may be displayed in a vicinity of a displayed object with which the event or object task is associated. An electronic note associated with an object may also be visually attached to the object by a line extending between the note and the object.

Similarly, the editor module 118 and/or the simulator module 116 may selectively display the electronic note when a user places a cursor in the vicinity of the object with which the electronic note is directly or indirectly associated.

Alternatively, or in addition, an electronic note may have a minimized and a maximized state. When in the minimized state, the electronic note may be displayed, e.g., as an icon. For example, the icon may be displayed in a vicinity of the object with which the electronic note is associated. In response to a trigger, the electronic note may be displayed in its maximized state. For example, the maximized state may be provided in response to a clicking on the electronic note icon.

In an example embodiment of the present invention, a link 1118 may be added to an electronic note for viewing item properties with which the electronic note is associated. For example, the properties may be shown graphically and/or textually. In one example embodiment, the editor module 118 may, by default, mark an originally captured object as the main object, which may be displayed for output of a simulation by the simulator 116, but may provide a graphical and/or textual representation of a modified version of the object with which an electronic note is associated in response to selection of a properties link 1118 of the electronic note. Similarly, if the electronic note is associated with a newly added object, in one example embodiment, the editor module may, by default, set the object's properties such that it is not visible during simulation output by the simulator module 116. The editor module 118 may provide for a user-override of the default settings. For example, selection of the validate control 1114 may be such an override.

In one example embodiment of the present invention, electronic notes and/or their layers may be provided as SML items that may be edited in one of the previously described edit modes, e.g., the fill-text and/or item-property edit modes. In an alternative example embodiment of the present invention, electronic note management may be provided in a separate electronic note edit mode.

In one example embodiment of the present invention, the above described edit modes may be used in concert. For example, the editor module 118 may provide for copying the selected item 904 (or its corresponding graphical representation 903) from the item editor window 900, and pasting it to a portion of a frame 1002 of the sequence editor window 1000, or similarly dragging and dropping the selected item 904 (or its corresponding graphical representation 903). Similarly, the editor module 118 may provide the item editor window 900 in response to selection of an item in a frame 1002 of the sequence editor window 1000. The editor module 118 may provide another example inter-mode operation, whereby the item editor window 900 and/or the sequence editor window 1000 is displayed in response to selection of the properties link 1118 of an electronic note.

In an example embodiment of the present invention, prior to validation of a modification of an item of an application state represented by a particular frame 1002 of the sequence editor window 1000, the editor module 118 may provide an additional frame 1002 including the modification, e.g., parallel to the particular frame 1002 but out of the particular frame's film sequence 1004.

In an example embodiment of the present invention, the system and method may save both the original simulation file 122 and one or more modified simulation files 122' as alternative simulation versions. Each saved version may be input into the simulator module 116 for output of a corresponding simulation. However, before modification of the real application 101 to generate versions of the real application 101 that correspond to the simulation versions, while the original simulation file may simulate a transaction as it would occur in the real application 101, it may occur that one or more of the simulations corresponding to the modified simulation files 122' do not simulate a transaction as it would occur in any version of the real application 101, but rather simulate the transaction as it would occur in a proposed version of the real application 101. Indeed, a modified simulation file 122' may be used as a specifications document indicating desired modification to be made to the real application 101.

However, it may occur that a programmer determines that a requested modification represented in the modified simulation file 122' is unfeasible, overlooks one or more of the requested modifications, or incorrectly modifies the real application 101 to include behavior matching a requested modification. Additionally, even where the real application 101 is modified to include behavior matching a requested modification, unforeseen results may be obtained. Accordingly, testing of the modified real application 101 may be required.

In an example embodiment of the present invention, the system and method may provide for automatic re-grabbing of a transaction in a real application 101 based on a previously generated simulation file 122 or modified simulation file 122'. The re-grabbing may be performed for testing the modified real application 101 to facilitate determination of whether its modification is in accordance with requested modifications reflected in the modified simulation file 122'. It is noted that re-grabbing is not limited to an application where it is used for testing a modified real application 101. For example, re-grabbing may be performed for updating a tutorial simulation.

For re-grabbing, a simulation file, e.g., the modified simulation file 122', may be input to the grabber module 108 for performance by the grabber module 108 of an automatic capture procedure on its basis, instead of on the basis of the transaction sequence file 124, i.e., the modified simulation file 122' may be used as a transaction sequence file. Based on the input simulation file, the grabber module 108 may perform the procedure illustrated by the flowchart of FIG. 5 (with reading of the input simulation file at 500). With respect to actions indicated to have been performed automatically by the real application 101, the grabber module 108 may, during the re-grab, perform the action instead of allowing the real application 101 to perform the action as it did during the first simulation capture on which the current re-grab is based. In an alternative embodiment of the present invention, the grabber module 108 may wait for the real application 101 to perform an action where it is indicated that the real application 101 had previously performed an action.

However, to implement the re-grabbing, it may be required for a user to manually navigate within the real application 101 to a first state represented in the input simulation file and then instruct the grabber 108 to begin the automatic re-grabbing.

Additionally, where re-grabbing is used for testing a modified real application 101, it may occur that an item of the input simulation file that is equivalent to an item of the modified real application 101 is not identified as it would otherwise have been identified had it been included in the simulation file during item capture by the grabber module 108. This may occur if a new item is inserted into the simulation file during editing of the simulation file, where the item is either a newly defined item or one copied from the SML library but originally included in the SML library based on a different application. For example, an identification in a simulation file of an item captured by the grabber module 108 may be formed based on the real application's item description. However, the item description in the modified simulation file might not be based on the real application's item description. Accordingly, performance of 300 and 502/304 may require additional matching operations discussed in detail below.

In regards to a tutorial simulation update, the newly output simulation file may replace the input simulation file for use as the tutorial. In regards to automatic testing of a modified real application 101, a comparison between the newly output simulation file generated during the re-grab and the input simulation file may be performed.

Figure 12:
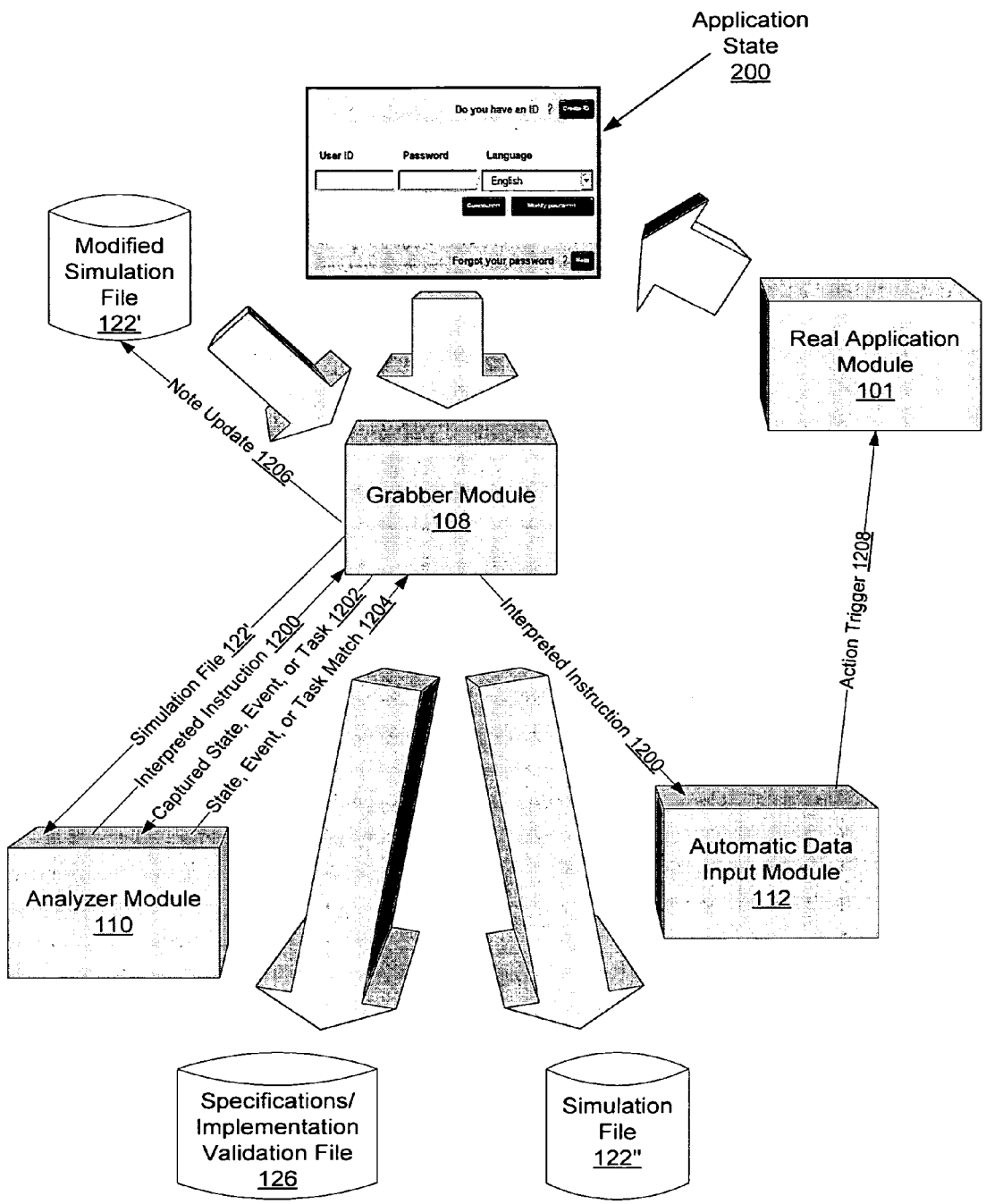
FIG. 12 is a data flow diagram that illustrates a procedure that may be performed for automatic testing of a modified application, according to an example embodiment of the present invention.

FIG. 12 is a data flow diagram that illustrates a procedure that may be performed for automatic testing of a modified real application 101. A modified simulation file 122' may be input to the grabber module 108. In one example embodiment, it may be required for the user to initially run and navigate within the real application 101 until a particular predetermined application state is obtained before beginning the automatic re-grabbing. Once the initial state is obtained, a procedure may be begun for capturing generated states 200 of the real application 101. In an alternative example, embodiment, the grabber module 108 itself may run the real application 101, for example, where the initial state represented by the simulation file 122' is an initial state of the real application 101.

With reference to FIG. 5 in combination with FIG. 12, if a next step in the simulation file 122' indicates performance of a user action, the grabber module 108 may proceed to 502. For performance of 502, the grabber module 108 may pass the simulation file 122' or a relevant part thereof to the analyzer module 110. The analyzer module 110 may heuristically search objects and/or actions defined by the real application 101 for a match of an object of the simulation file 122' to which the indicated action is to be applied and/or of the indicated action itself. For example, the analyzer module 101 may have access to an item library of the application module 101, and may search for items exhibiting similar properties to those of the relevant simulation file items. A non-exhaustive list of properties that may be used for the heuristic search may include size, shape, position, color, and or operability. The analyzer module 110 may perform the search according to predefined rules. For example, the rules may indicate a degree of similarity required with respect to the different properties for a determination of equivalence. In one variant, an overall score may be calculated based on separate degrees of equivalence determinations made for the different properties.

If the analyzer module 110 heuristically finds a probable match, the analyzer module 110 may return an interpreted instruction 1200 that instructs the grabber module to perform an action using the matched items. For example, if an object to which an action is to be applied is matched to a button identified according to terminology of the real application 101 as "control 76," the interpreted instruction 1200 may identify control 76 as the object of the action to be performed. It may occur that an action requires a certain context indicated by the SML script of the simulation file 122'. In this case, it may be required to match more than just the object on which the action is to be performed. It may be required to match other objects that are included in the indicated context.

For performance of an action, the grabber module 108 may pass the interpreted instruction to the automatic data input module 112, which may input an action trigger 1208, including data input if any, to the real application 101. The corresponding SML event may be captured at 304. Although performance of the action may be based on the heuristic comparison performed by the analyzer module 110, it may nevertheless occur that the resulting captured event is not an equivalent to that related to the action indicated by the simulation file 122'. For example, differences may frequently occur with respect to an associated context. Additionally, although the analyzer heuristically determines that objects and states are equivalent, it may occur that the analyses is incorrect.

Accordingly, at 304, the grabber module 108 may pass the captured event 1202 to the analyzer module 110, which may heuristically search for a matching event in the simulation file 122'. In one example embodiment of the present invention, the search may be within the entire simulation file 122'. This wide search may be performed since it may be determined that the state in which the action was performed in the real application 101 matches or approximately matches a different state of the simulation file. In this instance, it may be determined that a state sequence, but not an implementation of an action itself, is incorrect.

In an alternative embodiment, instead of a search, the analyzer module 110 may heuristically determine whether the event in the simulation file 122' that is associated with the action of the immediately preceding output interpreted instruction 1200 matches the captured event. With respect to the preceding two embodiments, the analyzer module 110 may pass the event match 1204 back to the grabber module 108.

If no event equivalent is found, the analyzer may re-perform the heuristic matching to determine if an action, different than the one previously indicated to the grabber module 108, should have been performed by the grabber module 108.

If such a determination is made, then the new match may be passed to the grabber module 108, so that it may re-perform an action at the previous state of the real application 101. This may require re-performing the re-grab starting from the initial grab state. If no action equivalent is found, then the re-grab may be terminated, as is described below.

In one example embodiment of the present invention, if an equivalent to an action (or other elements, such as a state or object, etc.) of a currently used simulation file 122' is not found in the real application 101, the grabber module 101 may, before a termination, or other indication of inconsistency, search other available simulation files 122', if any are available to the grabber module 108, to determine if an action of a particular state as indicated by the currently used simulation file 122' is replaced with a different action in another of the simulation files 122'. For example, a plurality of simulation files 122' may be stored at a location to which the grabber module 108 and/or analyzer module 110 has access. The grabber module 108 and/or the analyzer module 110 may attempt performance of an alternative action indicated in one of the other of the plurality of simulation files 122'. If a resulting captured event matches that of the other simulation file 122' and a resulting captured state matches that of the originally used simulation file 122', the grabber module 108 may assume that the action indicated in the originally used simulation file 122' is a mistake, and may continue using the original simulation file 122' for continuing the re-grab after performance of the action indicated in the other simulation file 122'. The grabber module 108 may note the mistake of the original modified simulation file 122'. Such notations may be provided, e.g., just as the grabber module 108 may note differences between the simulation file 122' and the real application 101, as is described below. In one example embodiment, instead of accessing other modified simulation files 122', the grabber module 108 may suspend the automatic re-grab, and may output a message to the user requesting a temporary manual takeover to perform the correct action. If the user can perform a different action than the one indicated by the analyzer 110, the analyzer 110 may determine whether the actually performed action matches any indicated by the simulation file 122'. If it does, then the analyzer module 110 may indicate this to the grabber module 108. If not, this too may be indicated to the grabber module 108. If the latter occurs, then the action difference may be noted by the grabber module 108 for indicating a mistake in the simulation file 122'. If the user determines that an action that should have been performed, e.g., as is indicated by the simulation file 122', then the user may indicate this, in response to which the re-grab may be terminated (since the real application 101 does not conform to the specifications of the modified simulation file 122').

In yet another alternative embodiment, the grabber module 108 may assume the match, without passing the captured event to the analyzer module 110, since an action match may indicate that the events match.

If a next step in the simulation file 122' indicates performance of a state capture, the grabber module 108 may proceed to 300. At 300, the grabber module 108 may pass the captured state (and/or object task for changing to the captured state) 1202 to the analyzer module 110. The analyzer module 110 may heuristically determine whether an equivalently defined state is indicated in the simulation file 122'. If a match is found, the state (and/or object task) match 1204 may be passed to the grabber module 108.

It may occur that the analyzer module 110 determines that the simulation file 122' includes an approximate but not exact match. For example, the simulation file 122' may include a state that includes equivalents of almost all objects of the captured state but that is missing only a few of the objects. Similarly, the simulation file 122' may include a state that includes approximate, but not exact, equivalents of all objects of the captured state. Similarly, the exact equivalent state may be found but at a different point in the state sequence than in which the captured state is present. In an example embodiment of the present invention, the analyzer module 110 may indicate differences to the grabber module 108 along with the passed state (and/or object task) match 1204. Similarly, if no match is found, this too may be indicated to the grabber module 108.

In one example embodiment, immediately subsequent to performance of an action in the real application 101, the grabber module 108 may capture a resulting state for comparison with a following state in the simulation file 122', even if a state capture following the action is not represented in the simulation file 122'. This may occur where subsequent to the action represented in the simulation file 122', the represented state is the same as that which is represented to exist prior to the performance of the action. Nevertheless, the grabber module 108 may capture the state in the real application 101 so that a determination may be made regarding the extent of differences, if any, in a state sequence represented in the simulation file 122' and that which actually occurs in the real application 101. If a difference is found, then in one example embodiment, the new state may be included in the new simulation file 122". Alternatively, or in addition, it may be included in the modified simulation file 122' with a modification request, as is described below with respect to an electronic note. Alternatively, since the modified simulation file 122' does not indicate a state capture, the new state may be indicated in the specifications/implementation validation file 126, discussed below, without inclusion of the state in either of the simulation files 122' or 122".

It is noted that a new simulation file 122" is not required. Instead, during the re-grab, the grabber module 108 may temporarily store data of the re-grab for comparison of the newly captured data with data of the modified simulation file 122'. Based on the comparison, the modified simulation file 122' may be edited or the specifications/implementation validation file 126 may be generated by the grabber module 108, as is discussed below, for indicating differences between the modified simulation file 122' and the new capture.

After performance of all operations associated with the read instruction, if the end of the transaction sequence file has been reached, the grabber module 108 may, at 308, terminate the automatic item capture. Otherwise, the grabber 108 may loop back to read the next transaction sequence file instruction at 500. Additionally, the grabber module 108 may prematurely terminate the automatic item capture at 502 if the analyzer cannot find a real application equivalent to an action of the simulation file 122'. Similarly, the grabber module 108 may prematurely terminate the automatic item capture at 502 if it cannot execute the interpreted instruction 1200. This may occur, for example, if an action is to be applied to an object that is not present in a current application state 200. Similarly, the grabber module 108 may prematurely terminate the automatic capture 502, if after a state capture, it is determined that the simulation file 122' does not include an equivalent or at least approximate equivalent of the captured state. It is noted that even if there are differences in that which is included in the state of the real application 101 and that which is included in the corresponding state of the simulation file 122', this does not require premature termination. For example, the state of the real application 101 may be missing one or more objects indicated by the simulation file 122', but a next action to be performed may be associated with an object for which an equivalent, or substantially equivalent, object is included in the state of the real application 101.

Based on the captured events and states, the grabber module 108 may output a new simulation file 122", representing a simulation of the modified application 101. Where objects, events, and/or object tasks are defined differently in the simulation file 122' and the modified real application 101, the grabber module 108 may include both definitions in the simulation file 122". The grabber module 108 may include both definitions in an embodiment where the specifications/implementation validation file 126 is generated in batch, e.g., after generation of the simulation file 122", as will be discussed below. Alternatively, the grabber module 108 may choose the real application definition for the simulation file 122".

It may occur that subsequent to a representation of a particular simulated state in the simulation file 122', the simulation file 122' includes representations of branches to a plurality of subsequent states. For example, a plurality of control objects may be included in a first represented state of the simulation file 122'. Referring to FIG. 10, subsequent to a particular frame 1002 corresponding to the first represented state, the simulation file 122' may include a plurality of branch film sequences 1002, each associated with a different control. In one example embodiment of the present invention, a different simulation file 122' may be generated for each separate branch, so that each one of the different simulation files 122' may be separately input to the grabber module 108. Similarly, in an embodiment where, for conflicting requests that are entered with respect to a particular state, a plurality of parallel frames 1002 are provided, different simulation files 122' corresponding to the different alternatives may be generated, so that each one of the different simulation files 122' may be separately input to the grabber module 108.

In an alternative example embodiment, the branches or conflicting requests may be provided in a single simulation file 122' to the grabber module 108, which may automatically repeat the re-grabbing procedure for each branch or request.

By running both the simulation file 122' and the simulation file 122", a user may identify whether the modified application 101 accords with the application behavior requested in the simulation file 122'. Additionally, in an example embodiment of the present invention, the grabber module may copy electronic notes of the simulation file 122' into the simulation file 122" and may update the electronic notes to indicate whether a request has been implemented. Alternatively, or in addition, the electronic note of the modified simulation file 122' may be so updated by including a note update 1206 in the modified simulation file 122'. According to this latter embodiment, a single simulation file 122' may include the entire application modifications and simulation modifications history.

According to the embodiment in which a single simulation file is updated, used for a re-grab, modified during the re-grab to indicate differences between the simulation indicated by the simulation file and the real application 101, and then modified again by the user, etc., so that the single simulation file may include the entire version history, different version comparisons may be performed based on the same simulation file. For example, in response to each user modification, the editor module 118 may automatically generate a new electronic note associated with the modification and indicating a version number or a time of change. It may be required for a user to, at some point, indicate a state of the simulation file 122' that is to be considered a new version. Alternatively, the state of the simulation file 122' at the time it is passed to the grabber module 108 for a re-grab may be set by the re-grab as a new version. When input to the grabber module 108 for performance of a re-grab, the user may indicate that the real application 101 should be compared to a particular one of the versions (or dates/times) of the simulation file 122'. The grabber module 108 may then ignore modifications entered in a later version (or at a later time). This may be desirable, for example, if, after some modifications, it is determined that a previous version might have been better than the current version, or if a re-grab was not performed after every new generation of a version of the simulation file 122'.

Similarly, versions of the real application 101 may be stored, and a user may indicate to the grabber module 108 which real application version to compare to the simulation file 122' (or particular version thereof). When the grabber module 108 notes changes or indicates implementations in the real application 101 of items of the modified simulation file 122', the grabber module 108 may note the particular simulation file version and real application version being compared.

Since an entire modifications history may be included in a single simulation file, it may occur, therefore, that a single simulation file 122' includes data for output, e.g., by the simulator module 116, of a plurality of different simulations. For example, a user may instruct the simulator module 116 to play a simulation of a particular prototype version, where a prototype version refers to a simulation based on a version of user entered modifications to the simulation file 122'. Similarly, the user may instruct the simulator module 116 to play a simulation of a particular real application version, which may refer to a those objects, events, and/or object tasks, captured during an initial grab or re-grab. The simulator module 116 may responsively play those selected items that are indicated, e.g., via an electronic note, to be of the requested prototype and/or real application version.

For example, the grabber module 108 may add a new layer 1102 to an electronic note 1100. The new layer 1102 may include a message indicating that the requested feature has been implemented or that it has not been implemented. Additionally, if the analyzer determines that the modified application 101 includes an item substantially, but not exactly equivalent to the requested item, the new layer 1102 may include a message identifying the substantially equivalent item and differences between the item and that requested. For example, if the actually included item is equivalent except for a minor difference in the size of text included in the item, the analyzer 101 may determine equivalence with minor variation, which may then be indicated by the grabber 101 in a new layer 1102 of an electronic note 1100 associated with the item.

In one example embodiment of the present invention, the grabber module 101 may insert an entirely new electronic note 1100 into the simulation file 122" (and/or into the modified simulation file 122' for generating a complete modifications history, as discussed above). For example, if a captured state includes one or more objects not included in the corresponding state of the simulation file 122', the grabber module 101 may append to the new object an electronic note 1100 with a request layer 1102 requesting inclusion of the object into the real application 101 and a status layer 1102 indicating its implementation.

In an example embodiment of the present invention, aside from indicating comparison results by the grabber module 108 via electronic notes appended to items of the simulation file 122", the grabber module 108 may generate a specifications/implementation validation file 126, listing all differences between the behavior of the modified real application 101 and the requested application behavior indicated in the simulation file 122'. In one example embodiment, the specifications/implementation validation file 126 may be generated in batch, e.g., via the analyzer module 110 and based on all stored item definitions, subsequent to the generation of the simulation file 122".

The newly generated simulation file 122" may be input to the editor module 118 for repeating the modification validation cycle. For example, the cycle may be repeated until the specifications/implementation validation file 126 indicates full compliance of the modified real application 101 with the application behavior indicated in the final modified simulation file 122' and the simulation run by the simulator module 116 based on the final output simulation file 122" is deemed satisfactory.

Figure 13:
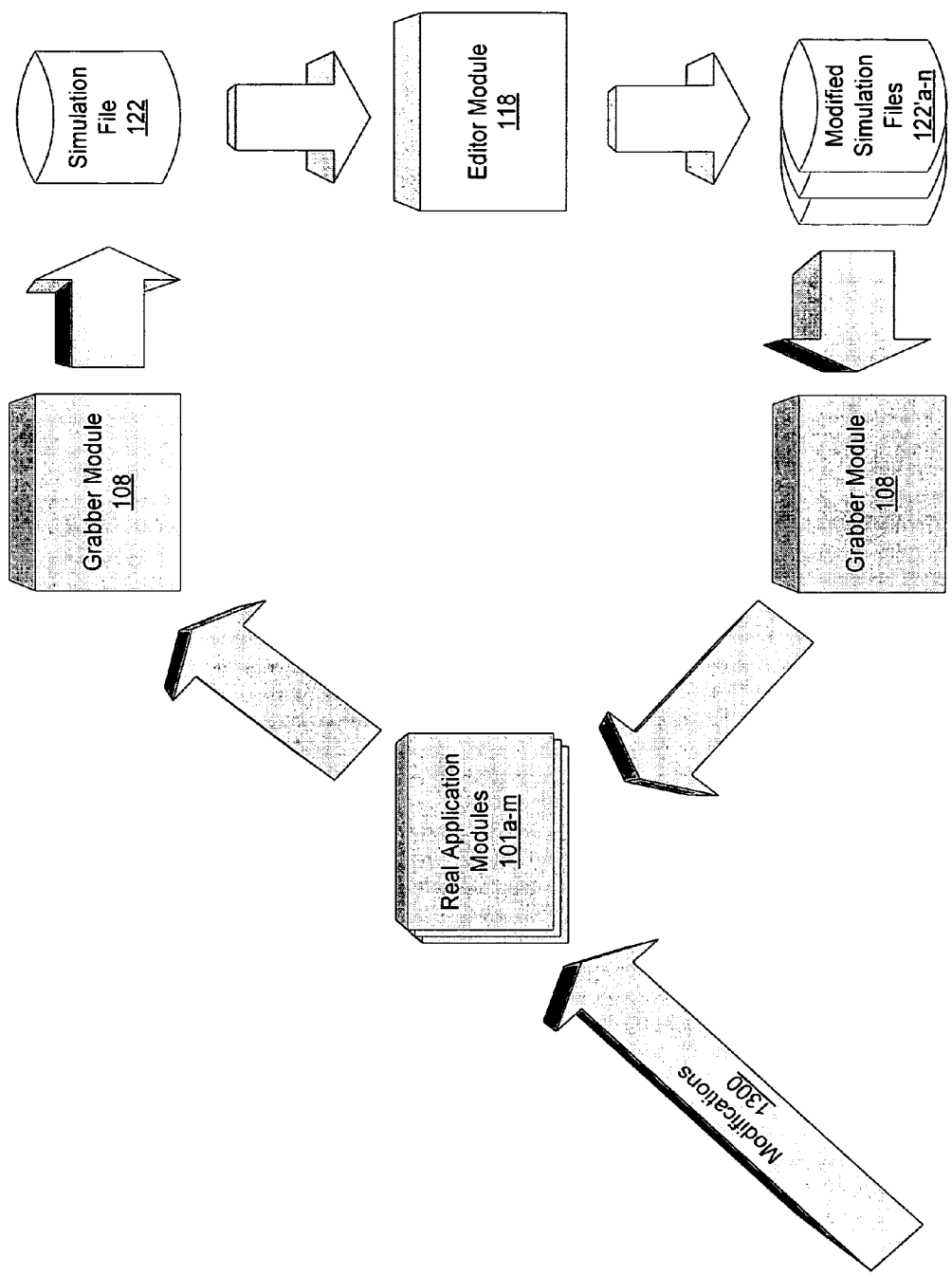
FIG. 13 is a data flow diagram that illustrates a repetitive simulation file generation cycle, according to an example embodiment of the present invention.

FIG. 13 illustrates this repetitive cycle. As shown in FIG. 13, based on the real application 101, the grabber module 108 may output a simulation file 122, which may be edited via the editor module 118 to produce one or more modified simulation files 122'a-n, one or more of which may in turn be input to the grabber module 108, which may, on the basis of the input modified simulation file(s), recapture a transaction performed during execution of the real application 101 to obtain yet another simulation file 122, which may be different than the first obtained simulation file 122, depending on modifications 1300, if any, made to the real application 101, e.g., based on the modified simulation(s). Since between cycles, the real application 101 may be modified, the newly generated simulation files 122 of the different cycles may be generated based on different ones of a plurality of real applications 101a-m, i.e., different application versions.

Figure 14:
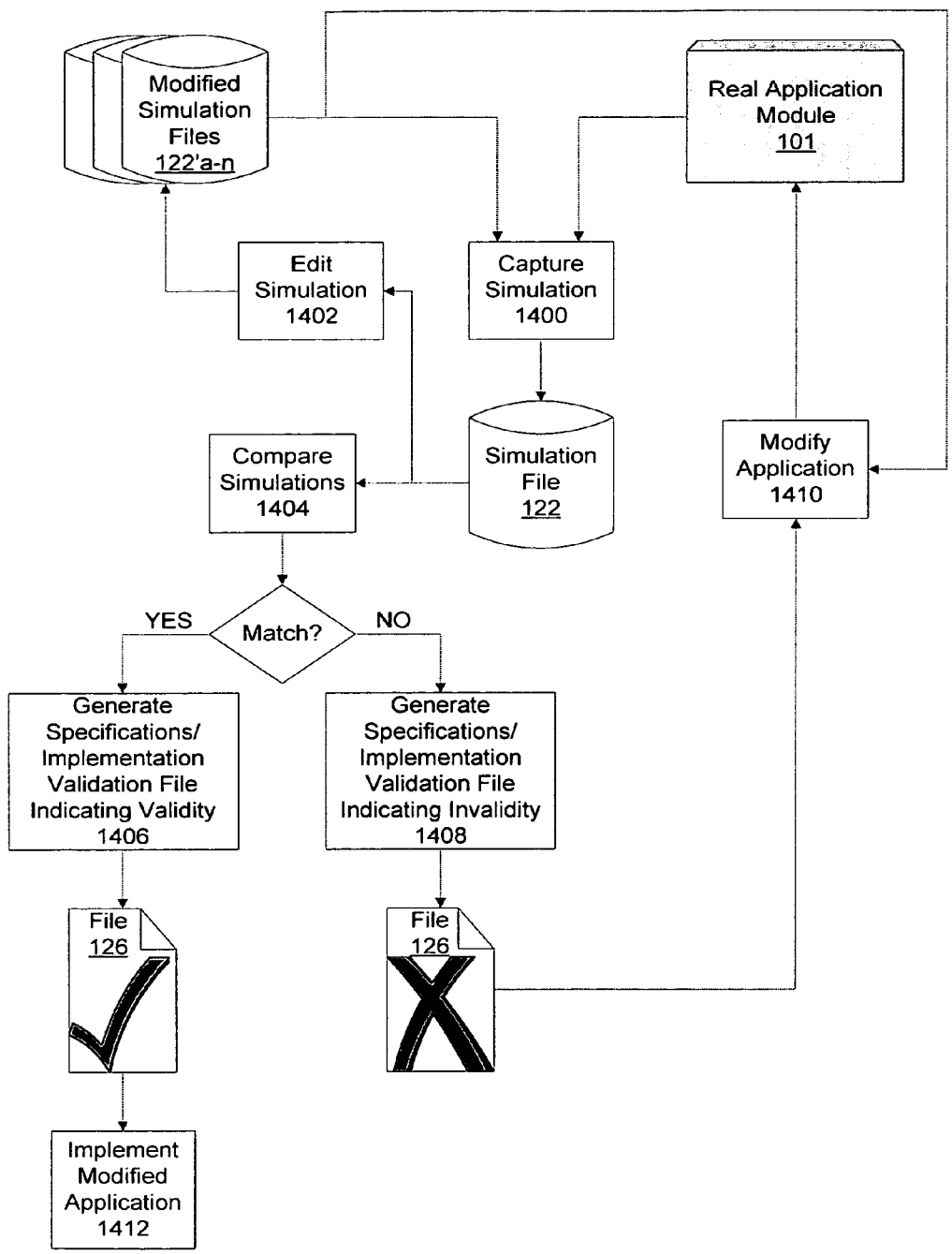
FIG. 14 is a flowchart and data flow diagram that illustrates an example iterative application modification and simulation

FIG. 14 is a flowchart and data flow diagram that illustrates an example cycle that may performed according to an example embodiment of the present invention, during which modifications to the real application 101 may be requested, implemented, and tested for validity for obtaining an at least temporary final version of the real application 101 that may be ready for implementation. At 1400, the system and method may capture a simulation of a transaction executed in the real application 101. For example, the capture may be performed based on user capture instructions or automatically based on the transaction sequence file 124. The captured simulation may be output as a simulation file 122.

At 1402, the system and method may edit the simulation file 122 based on user interaction with the editor module 118, to produce one or more modified simulation files 122'a-n. One or more of the modified simulation files 122'a-n may be used as a specifications document based on which programmers may, at 1410, modify the real application 101.

The system and method may repeat 1400 based on the one or more of the modified simulation files 122'a-n, to produce one or more new simulation files 122 that may reflect the modifications made at 1410. The system and method may repeat 1402 if a user inputs additional edit instructions to the editor module 118.

Additionally, the system and method may, at 1404, compare the new simulation file(s) 122 with the modified simulation file(s) 122' on which the immediately preceding performance of 1400 was based. If there is a match between the simulation file(s) 122 and the modified simulation file(s) 122', the system and method may, at 1406, produce a specifications/implementation file 126 indicating validity of the modifications made to the real application 101. Unless a user determines that, despite the integration into the real application 101 of the application behavior requested by the specifications document, further changes to the real application 101 are required, the modified real application 101 may be implemented at 1412.

If there is not a match between the simulation file(s) 122 and the modified simulation file(s) 122', the system and method may, at 1408, produce a specifications/implementation file 126 indicating invalidity of the modifications made to the real application 101. Based on the specifications/implementation file 126 output at 1408, the programmers may perform 1410 to further modify the real application 101, e.g., if the producers of the specifications document do not indicate approval of the modified real application 101 indicated to be invalid.

Subsequent to the further modifications, 1400 and 1404 may be repeated to determine if the further modified real application 101 is valid in view of the modified simulation file(s). For this iteration of 1400, the modified simulation file(s) 122' used for the preceding iteration of 1400 may be used again if further modification requests are not desired.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer application development method, comprising:

during, and based on, a first execution of a program, the first execution of the program including interaction with graphical user interface objects:
   automatically identifying, by a processor, at least one object class instantiation according to which a respective one of the graphical user interface objects is displayed and that is associated by the program with a program state obtained during the first execution of the program; and
   automatically storing, by the processor, in a first file a description of the identified at least one object class instantiation, wherein at least a portion of the first execution of the program is simulatable without execution of the program and based on the first file to display a sequence of graphical user interface screens in which the at least one respective graphical user interface object is displayed; and
modifying the first file in response to a user interaction with a displayed one of the at least one respective graphical user interface object, wherein a modified version of the at least the portion of the first execution of the program is simulatable based on the modified first file.

2. The computer application development method of claim 1, wherein a simulation based on the modified first file represents a program modification request.

3. The computer application development method of claim 1, further comprising:
   in accordance with the modified first file, automatically interacting with the program during a second execution of the program by emulating a user interaction with a graphical user interface that is produced by execution of the program;
   during the second execution, generating a simulation data, wherein at least a portion of the second execution of the program is simulatable based on the simulation data.

4. The computer application development method of claim 3, further comprising:
   during the first execution, storing in the first file data representing user-entered text that is input during the first execution.

5. The computer application development method of claim 4, wherein the automatic interaction includes inputting the user-entered text represented in the first file.

6. The computer application development method of claim 3, further comprising:
automatically comparing the simulation data to the modified first file; and
generating a report indicating whether the simulation data and the modified first file match.

7. The computer application development method of claim 6, wherein, if the simulation data and the modified first file do not match, the report identifies at least one difference between the simulation data and the modified first file.

8. The computer application development method of claim 7, wherein the at least one difference is with respect to at least one of: a set of properties associated with at least one of an object class instantiation and an event class instantiation, a property value, and a sequence of represented program states.

9. The computer application development method of claim 6, further comprising:
during the comparing of the simulation data to the modified first file, heuristically determining for at least one of an object class instantiation and an event class instantiation described in the modified first file whether the simulation data includes an equivalent thereof.

10. The computer application development method of claim 9, wherein the heuristic determination comprises:
analyzing at least one of a set of properties and at least one property value associated with at least one of an object class instantiation and an event class instantiation described in the simulation data and associated with the at least one of the object class instantiation and the event class instantiation described in the modified first file to determine a degree of similarity therebetween.

11. The computer application development method of claim 3, further comprising:
automatically comparing the simulation data to the modified first file; and
inserting into at least one of the modified first file and a second file in which the simulation data is stored a description of at least one of an instantiation of a note object class and a layer of the note object instantiation that indicates a result of the comparison.

12. The computer application development method of claim 11, wherein:
the result of the comparison is associated with a particular object class instantiation described in the at least one of the modified first file and the second file; and
the description of the at least one of the instantiation of the note object class and the layer of the note object instantiation is associated with the description of the particular object class instantiation.

13. The computer application development method of claim 11, wherein, responsive to a determination during the comparison that the simulation data includes a description of one of an object class instantiation and an event class instantiation not included in the modified first file, the inserted description is provided as an application modification request.

14. The computer application development method of claim 3, wherein the automatic interaction further comprises:
heuristically determining at least one of (a) if a present program state of the second program execution corresponds to a program state representation in the modified first file in accordance with which it is determined which particular user interaction should be an immediately following user interaction, (b) if the present program state of the second program execution includes an instantiation of an object class identified in the modified first file and with which the particular user interaction should be performed, and (c) if the particular user interaction is performable with the object class instantiation of the present program state of the second program execution that is identified in the modified first file and with which the immediately following user interaction should be performed.

15. The computer application development method of claim 14, wherein the heuristic determination includes determining that at least one of an object class instantiation and an event class instantiation of the present program state is equivalent to at least one of an object class instantiation and an event class instantiation described in the modified first file that is identified by the modified first file differently than by the program.

16. The computer application development method of claim 1, wherein:
the modification of the first file includes an insertion into the first file of a description of a note object class instantiation that includes information one of directly and indirectly regarding another object class instantiation described in the first file;
the description of the note object class instantiation is associable with the description of the another object class instantiation; and
a representation of the note object class instantiation is output based on the description association.

17. The computer application development method of claim 16, wherein a representation of the another object class instantiation is output based on the description association.

18. The computer application development method of claim 17, wherein:
the note object class instantiation includes a link to the representation of the another object class instantiation;
the representation of the another object class instantiation is output in response to a user selection of the link; and
the representation of the another object class instantiation includes at least one of a graphical representation and the description of the another object class instantiation.

19. The computer application development method of claim 16, wherein the representation of the note object class instantiation is output during at least one of a simulation output mode and a simulation edit mode.

20. The computer application development method of claim 19, wherein the note object class instantiation includes a settable output mode property and which of the simulation output mode and the simulation edit mode during which the representation of the note object class instantiation is output depends on a value of the output mode property.

21. A hardware computer-readable medium having stored thereon instructions adapted to be executed by a processor, the instructions which, when executed, cause the processor to perform a computer application development method, the computer application development method comprising:
during, and based on, an execution of a program, the execution of the program including interaction with graphical user interface objects:
automatically identifying at least one object class instantiation according to which a respective one of the graphical user interface objects is displayed and that is associated by the program with a program state obtained during the execution of the program; and
automatically storing in a file a description of the identified at least one object class instantiation, wherein at least a portion of the execution of the program is simulatable without execution of the program and based on the file to display a sequence of graphical user interface screens in which the at least one respective graphical user interface object is displayed; and modifying the file in response to a user interaction with a displayed one of the at least one respective graphical user interface object, wherein a modified version of the at least the portion of the execution of the program is simulatable based on the modified file.

22. A computer application development system, comprising:

at least one computer processor configured to:

during, and based on, an execution of a program, the execution of the program including interaction with graphical user interface objects:

automatically identify at least one object class instantiation according to which a respective one of the graphical user interface objects is displayed and that is associated by the program with a program state obtained during the execution of the program; and automatically store in a file a description of the identified at least one object class instantiation, wherein at least a portion of the execution of the program is simulatable without execution of the program and based on the file to display a sequence of graphical user interface screens in which the at least one respective graphical user interface object is displayed; and modify the file in response to a user interaction with a displayed one of the at least one respective graphical user interface object, wherein a modified version of the at least the portion of the execution of the program is simulatable based on the modified file.

23. A computer application simulation generation method, comprising:

based on a first file that includes data interpreted as a description of a sequence of user interactions with a computer program and as including at least one state capture instruction, automatically interacting with the program during a first execution of the program, the automatic interacting including an emulation of a user interaction with graphical user interface objects of a graphical user interface that is produced by execution of the program;

for at least one program state obtained as a result of the automatic interaction during the first execution of the program, and based on the first execution of the program:

automatically identifying at least one object class instantiation according to which a respective one of the graphical user interface objects is displayable and that is associated by the program with the program state; and storing in the first file a description of the identified at least one object class instantiation, wherein at least a portion of the first execution of the program is simulatable without execution of the program and based on the first file in which the description of the identified at least one object class instantiation is stored to display a sequence of graphical user interface screens in which the at least one respective graphical user interface object is displayed; and modifying the first file in response to a user interaction with one or more of the displayed at least one respective graphical user interface object, wherein a modified version of the at least the portion of the first execution of the program is simulatable based on the modified first file.

24. The computer application simulation generation method of claim 23, wherein at least a portion of a second execution of the program that occurred prior to the first execution of the program is simulatable based on the first file.

25. The computer application simulation generation method of claim 23, wherein the data interpreted as the description of the sequence of user interactions with the computer program and as including the at least one state capture instruction is inserted into the first file automatically during a second execution of the program that occurs prior to the first execution of the program.

26. The computer application simulation generation method of claim 25, wherein, prior to the automatic interaction with the program based on the first file during the first execution of the program, the first file is also usable for simulation of the second execution of the program.

27. A computer application development method, comprising:

responsive to, and in accordance with, execution of a program, automatically generating, by a processor, a simulation file playable for simulating at least a portion of the execution of the program without execution of the program, wherein:

the execution of the program includes display of graphical user interface objects; and the generating includes:

identifying at least one object class instantiation according to which a respective one of the graphical user interface objects is displayed and that is associated by the executed program with a program state obtained during the first execution of the program; and automatically storing in the simulation file a description of the identified at least one object class instantiation; and modifying the simulation file in response to a user interaction with a displayed one of the at least one respective graphical user interface object, wherein a modified version of the at least the portion of the execution of the program is simulatable based on the modified simulation file to display a sequence of graphical user interface screens in which a modified version of the one of the at least one respective graphical user interface object is displayed.

28. The method of claim 27, further comprising:

automatically interacting with the program, based on the simulation file, during a subsequent execution of the program; and updating the simulation file based on the subsequent execution of the program, the updated simulation file being playable for simulating a modified version of the at least the portion of the execution of the program.

* * * * *